July 29, 1969

W. T. BROSS 3,458,800

CONTROL CIRCUIT FOR ENERGIZING AN AC SUPPLIED LOAD
AT ZERO SUPPLY POTENTIAL

Filed Nov. 2, 1967

INVENTOR.
William T. Bross
BY Wood, Herron & Evans
ATTORNEYS

United States Patent Office 3,458,800
Patented July 29, 1969

3,458,800
CONTROL CIRCUIT FOR ENERGIZING AN AC SUPPLIED LOAD AT ZERO SUPPLY POTENTIAL
William T. Bross, Cincinnati, Ohio, assignor to Liebel-Florsheim Company, Division of Ritter Pfaudler Corporation, Rochester, N.Y., a corporation of New York
Filed Nov. 2, 1967, Ser. No. 680,220
Int. Cl. H01h 9/56
U.S. Cl. 321—47          19 Claims

ABSTRACT OF THE DISCLOSURE

A control circuit is disclosed which, in response to random actuation of a switch, triggers a silicon controlled rectifier connected in series with a load at a zero point in the potential waveform of an alternating current source connected supplying the load and rectifier. Also disclosed is a control circuit for triggering a silicon controlled rectifier and thereby energizing an alternating current supplied load for a predetermined interval beginning and ending at zero supply potential points independent of the point in the supply waveform when an appropriately connected switch is actuated to initiate the load energization interval.

---

This invention relates to control circuits for switching alternating current supplied loads the energization of which are controlled by silicon controlled rectifiers connected in series with the loads and, more particularly, to circuits for triggering silicon controlled rectifiers and thereby energizing and de-energizing alternating current supplied loads for either an indefinite or a predetermined interval beginning and ending at a zero supply waveform when suitable switch means are manually operated.

A number of industrial applications exist in which it is desirable to trigger a silicon controlled rectifier, which is in series with an alternating current supplied load, at a point in the supply potential waveform such that the initial load current level has a zero or substantially zero value. By triggering the silicon controlled rectifier in this manner, the load switching operation does not produce large current surges. As those skilled in the art will appreciate, current surges are undesirable because they damage the silicon controlled rectifier as well as produce high frequency transients which interfere with the proper operation of the triggering circuit.

Illustrative of an industrial application in which it is desirable to trigger a silicon controlled rectifier at a zero point, and thereby energize and de-energize an alternating current supplied load substantially at the zero current point, is in the field of switching circuitry for X-ray machines. In X-ray machines, alternating current power supplies are provided which are capable of supplying extremely high primary currents to high voltage transformers supplying the X-ray tube. If the silicon controlled rectifier, which controls energization of the X-ray tube, is randomly triggered at a point when the supply potential has a non-zero value, because of tube conduction characteristics, it is possible for load currents having exceedingly high values to immediately flow. The sudden change in load current occurring at the instant of switch closure generates an extremely large current surge, producing transients both high in frequency and large in amplitude. Such transients interfere with the normal operation of the trigger circuit and cause unprotected circuit components to be damaged. Likewise, if an X-ray machine which is already in operation is de-energized at random, it is possible and in fact likely that the exact point of de-energization occurs when the load current has some appreciable value. De-energizing at such a point necessitates the interruption of a current flow which, as before, creates undesirable current surges.

It has been an objective of this invention, therefore, to provide a control circuit for triggering a silicon controlled rectifier at a zero supply potential point, and thereby energize an alternating current supplied load at a zero load current point, notwithstanding random actuation of the control circuit. This objective has been accomplished in accordance with certain principles of this invention by providing a switch responsive triggering circuit for a silicon controlled rectifier which is series connected with the load between alternating current supply terminals. The triggering circuit includes an electrical energy storage circuit which is connected between the supply terminals of the alternating current source and the silicon controlled rectifier gate.

The storage circuit, in response to switch actuation, is operative during negative one-half cycles of the supply potential waveform when the SCR is reverse biased to store electrical energy, and is operative at the beginning of positive one-half cycles when the rectifier is forward biased to release the stored energy and thereby apply a triggering signal to the gate to enable the forward biased rectifier to latch in a conductive state and thereby energize the load at a substantially zero load current point. De-actuation of the switch disables the energy storage circuit, thereafter preventing the storage of electrical energy during negative one-half cycles and the subsequent triggering of the silicon controlled rectifier during positive one-half cycles. Since the silicon controlled rectifier is rendered nonconductive at the end of each positive one-half cycle due to its inherent unidirectional conducting properties, but is not otherwise rendered nonconductive by the absence of a triggering signal at its gate, disabling of the energy stored circuit by actuation of the switch at any time in the supply waveform is effective to de-energize the load only at a zero load current point.

In one embodiment of this invention, the energy storage circuit takes the form of a capacitor connected to the silicon controlled rectifier gate. The capacitor is adapted to charge during negative one-half cycles through a charging circuit including a diode which is connected to the supply and poled oppositely with respect to the silicon controlled rectifier, and to discharge to produce a triggering signal at the beginning of the positive one-half cycle, thereby enabling the silicon controlled rectifier to latch and energize the load.

In another embodiment of this invention, the energy storage circuit includes a capacitor connected to the silicon controlled rectifier gate which is adapted to be charged during negative one-half cycles by a phase shifter connected across the alternating current supply terminals, and to discharge to provide a triggering signal to the gate at the beginning of positive one-half cycles to latch the forward biased silicon controlled rectifier in a conductive state and thereby energize the load.

It has also been an objective of this invention to provide a control circuit for energizing a load for a predetermined interval beginning and ending at zero supply potential points irrespective of when in the supply potential waveform a switch is actuated to initiate the load energization interval. This objective has been achieved by providing first and second silicon controlled rectifiers, through which the load is energized, which are connected in series between the terminals of an alternating current supply, and independent first and second triggering circuits for each of the silicon controlled rectifiers which respectively insure that the silicon controlled rectifiers are initially triggered at a zero supply potential point and that one of the silicon controlled rectifiers through which the load is energized is disabled at the termination of the timing interval at a zero load current point.

In a preferred form of the invention, the first triggering circuit, which triggers the silicon controlled rectifiers at a zero supply potential point, includes means for applying triggering signals to the gates only when the supply potential waveform passes through the zero point going from negative to positive, thereby preventing both silicon controlled rectifiers from latching during a positive one-half cycle at other than a non-zero point should the switch be actuated at a random point in a positive one-half cycle. The second triggering circuit includes timing means for short-circuiting the gate-cathode junction of one of the silicon controlled rectifiers through which the load is energized upon the expiration of a predetermined timing interval, thereby preventign the load from again becoming energized after said one silicon controlled rectifier is de-energized during a negative one-half cycle by the reverse biasing action of the supply.

Other objectives and advantages of this invention will be more readily apparent from a detailed description of the invention taken in conjunction with the accompanying drawings in which.

Figure 1:
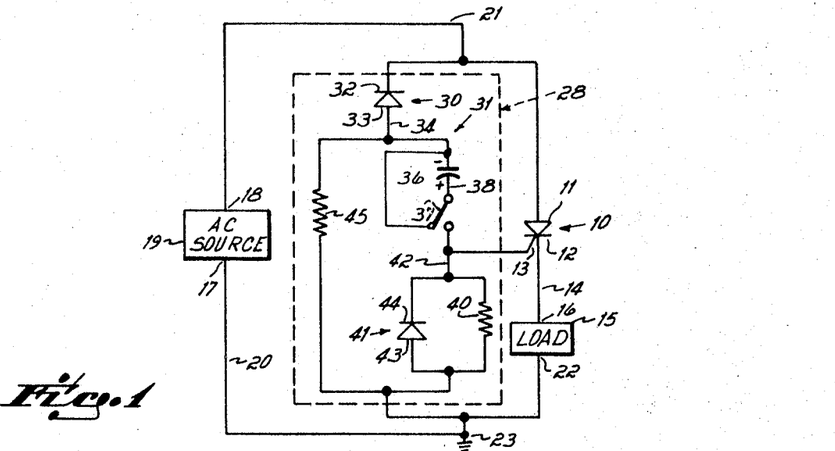
FIGURE 1 is an embodiment of a control circuit suitable for triggering a silicon controlled rectifier in series with a load at a zero point independent of when in the supply potential waveform a switch is actuated.

A preferred embodiment of a circuit for triggering a silicon controlled rectifier, through which a load is energized, at a point when the anode-cathode potential of the rectifier is zero is depicted in FIGURE 1. Referring to FIGURE 1, the circuit is seen to include a silicon controlled rectifier (SCR) 10 having an anode 11, a cathode 12, and a gate 13. The SCR 10 may be of any conventional type commercially available and may, for example, be one of the types described in Silicon Controlled Rectifier Manual, fourth edition, 1967, published by the General Electric Company.

The SCR 10 is connected in series with a suitable load 15 whose energization is to be controlled via a line 14 interconnecting the SCR cathode 12 and the load terminal 16. The load 15, which is shown schematically, may include any type of impedance means and may, for example, include inductance, capacitance or resistance, or a combination thereof. The series connected combination of the SCR 10 and the load 15 is connected between supply terminals 17 and 18 of a conventional alternating current source 19 via lines 20 and 21 which respectively interconnect the load terminal 22 with the supply terminal 17 and the rectifier anode 11 with the supply terminal 18. The supply terminal 17, for convenience, is preferably grounded as shown by ground connection 23.

With the SCR 10 connected as described, the junction between the anode 11 and the cathode 12 is alternately forward and reverse biased in synchronism with the alternations in potential of the source 19 output as the supply terminals 17 and 18. Specifically, if the potential of terminal 18 with respect to the potential of terminal 17 varies with respect to time in accordance with the plot W of potential versus time depicted in FIGURE 7, the junction formed by the anode 11 and cathode 12 is forward biased once per full cycle of the alternating supply waveform, namely, during the positive one-half cycle of the alternating supply waveform and is reverse biased once per full cycle of the alternating supply waveform, namely, during the negative one-half cycle of the alternating supply waveform. The bias on the junction formed by the anode 11 and the cathode 12 changes from forward to reverse as the supply potential waveform W depicted in FIGURE 7 goes through zero from positive to negative, and changes from reverse bias to forward bias as the waveform W passes through zero going from negative to positive.

The circuit depicted in FIGURE 1 is also seen to include a triggering circuit indicated generally by the reference numeral 28 which interconnects the supply terminals 17 and 18 of the source 19 and the gate 13 of the SCR 10. The triggering circuit 28 functions to apply a triggering signal to the gate 13 of the SCR 10 at the beginning of a positive one-half cycle at a point when the source potential waveform W depicted in FIGURE 7 has a value of approximately zero for enabling the SCR to latch in a conductive state and thereby continuously energize the load 15, which latching occurs when the load current reaches the minimum SCR anode current level necessary to enable the SCR to remain conductive after the triggering signal is removed. This function is accomplished by storing electrical energy during negative one-half cycles and releasing the stored energy in the form of a triggering signal applied to gate 13 during positive one-half cycles.

The triggering circuit 28 considered in more detail includes a diode 30 and an energy storage circuit 31 which are series connected between supply terminals 17 and 18 of source 19 via line 20 and 21, respectively. The diode 30 has a cathode 32 connected to the line 21 and an anode 33 connected to the line 34 and being so connected is poled oppositely with respect to the SCR 10. That is, the diode 30 is connected relative to the supply terminals 17 and 18 and the SCR 10 such that the diode junction formed by the anode 33 and the cathode 32 is forward biased and reverse biased when the junction formed by the anode 11 and the cathode 12 of the SCR 10 is reverse biased and forward biased, respectively.

The energy storage circuit 31 includes a capacitor 36 which is connected in a manner to store during negative one-half cycles electrical energy for triggering the rectifier 10 and latching it in a conductive state during positive one-half cycles. The capacitor 36 has one terminal connected to the diode anode 33 via line 34 and the other terminal connected to a switch 37 via a line 38. The switch 37 may be of any suitable type and may, for example, constitute a switch having a movable contact member capable of being positioned in an open position (shown) for simultaneously interrupting the electrical path through the switch and short-circuiting the capacitor terminals to discharge any accumulation of charge thereon, and movable to a closed position (not shown) for completing an electrical path through the switch.

The energy storage circuit 31 further includes the parallel combination of a resistor 40 and a diode 41 which, during negative one-half cycles, provides a charging path for the capacitor 36 as well as a reverse bias for the gate-cathode junction of SCR 10. The parallel combination of diode 41 and resistor 40 is connected between the supply terminal 17 and the switch 37 via lines 20 and 42, respectively. The diode 41 has an anode 43 connected to the supply terminal 17 via line 20 and a cathode 44 connected to the line 42, and is oppositely poled with respect to the SCR 10. The energy storage circuit 31 further includes a resistor 45 which functions to complete, during positive one-half cycles, a discharge path for the capacitor 36. The resistor 45 has one side thereof connected to both the anode 33 of diode 30 and one side of the capacitor 36 via the line 34. The other side of the resistor 45 is connected to the anode 43 of the diode 41, to the resistor 40 and to the supply terminal 17 via the line 20.

Figure 7:
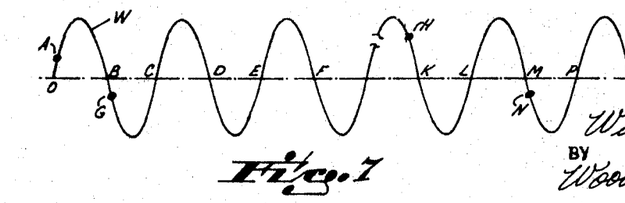

Assume the SCR 10 is in a nonconducting state and the source 19 is providing an alternating current waveform W of the type depicted in FIGURE 7. With the switch 37 in the open position (shown) no current flows through the path including diode 41, resistor 40, and capacitor 36. Since no current flows through either the resistor 40 or the diode 41, there is no voltage drop between line 42 to which the gate 13 of the SCR 10 is connected and line 20 connected to the supply terminal 17. Hence, the potential of the gate 13 is the same as that of the supply terminal 17. The potential of the cathode 12 of the SCR 10 is also substantially identical to the potential of the supply terminal 17 due to the fact that the nonconducting condition of the SCR 10 prevents a voltage drop across the load 15.

With the gate 13 and the cathode 12 of the SCR 10 both at the same potential, namely, the potential of the supply terminal 17, the SCR is not triggered. By the term "trigger," as used herein, is meant the application of a signal to the gate of an SCR, which signal is of sufficient deviation and is sufficiently positive with respect to the SCR cathode to (1) switch the SCR from a nonconducting state to a conducting state should the anode-cathode junction of the SCR concurrently be forward biased, that is, the anode more positive than the cathode, and (2) enable the SCR to remain conducting after the triggering signal is removed and until the instantaneous anode current drops below the SCR holding current. Stated differently, a triggering signal as defined herein is a signal which, if applied to the gate of an SCR when the SCR anode-cathode junction is forward biased, causes the SCR to latch in a conductive state. Obviously, a triggering signal as defined herein, if applied to the gate of an SCR when the SCR anode-cathode junction is reverse biased, is not effective to latch the SCR in the conductive state, or even render it conductive momentarily.

A further consequence of the switch 37 being in the open position (shown), in addition to effectively connecting the gate 13 and the cathode 12 to the supply terminal 17 and thereby preventing the application of a triggering signal to the gate, is that the capacitor 36 is short-circuited and therefore unable to accumulate charge, of either polarity, notwithstanding that there is a flow of current through the electrical path including the resistor 45 and the diode 30 during the negative one-half cycles of the supply waveform, that is, during the one-half cycles of the supply waveform when terminal 17 is more positive than terminal 18.

To trigger the SCR 10 to render it conductive during positive one-half cycles of supply potential, and thereby energize the load with a one-half wave rectified signal, the switch 37 is transferred from the open position (shown) to the closed position (not shown) completing a circuit between lines 42 and 38. Closure of the switch 37, assuming it is closed at random with respect to the waveform W of the supply 19 depicted in FIGURE 7, may occur either during a positive one-half cycle of supply potential such as at some arbitrary point A, or during a negative one-half cycle of supply potential such as at some arbitrary point G. In either case the SCR 10 is triggered to render it conductive only when the bias on the SCR anode-cathode junction is changing from a reverse bias condition to a forward bias condition, that is, at approximately point C in the supply waveform.

Assuming the switch 37 is closed during the positive one-half cycle O–B of the supply potential W shown in FIGURE 7, such as at point A, the SCR 10 is, at the instant of switch closure, forward biased by the supply 19. Although the SCR 10 is forward biased, it does not conduct during the remainder of the positive one-half cycle due to the absence of a triggering signal on gate 13. During the remainder of the positive one-half cycle, that is, from point A through point B of the waveform W, the diode 30 is reverse biased by the source 19. With the diode 30 reverse biased no current can flow through either the path including resistor 45 or the path including resistor 40, diode 41, closed switch 47 and capacitor 36 to generate a triggering signal on gate 13. In addition, since the capacitor 36 was in the uncharged state prior to closing the switch 37, the mere closure of the switch 37 is unable to generate a triggering signal on the gate 13 as by the discharge of the capacitor 36. Thus, from the instant the switch 37 is closed at point A through point B corresponding to the end of the positive one-half cycle O–B of the supply potential, the SCR 10, although forward biased by the supply 19, is not rendered conductive to energize the load 15 due to the inability of the triggering circuit 28 to generate a triggering signal on gate 13.

During the succeeding one-half cycle, that is, during the negative one-half cycle B–C, the SCR 10 is reverse biased by the source 19 and consequently does not conduct. However, during the negative one-half cycle B–C the diode 30 is forward biased by the source 19. With the diode 30 forward biased conventional current flows from supply terminal 17 through line 20 into the energy storage circuit 31. Specifically, conventional current flows through diode 41 and resistor 40 and switch 37 charging the capacitor 36 with the polarity shown in FIGURE 1. The current flow through the parallel path including resistor 40 and diode 41, in addition to charging the capacitor 36, is also effective to produce a voltage drop between the line 42 and the line 20, the potential of line 20 being more positive than the potential of line 42. With the potential of line 20 more positive than the potential of line 42, the junction formed by the cathode 12 and gate 13 of the SCR 10 is reverse biased, the potential of the cathode 12 being the same as that of line 20 due to the inability of the reverse biased SCR to conduct and produce a voltage drop across the load 15 and the potential of gate 13 having the same as that of line 42 due to the direct connection therebetween.

The reverse bias of the junction formed by the gate 13 and the cathode 12 of the SCR 10 continues throughout the entire negative one-half cycle, that is, throughout the entire period between point B and C on the waveform W depicted in FIGURE 7 inasmuch as there is still a flow of current through the diode 41 and the resistor 40 to charge the capacitor 36. However, due to the exponentially decaying nature of the capacitor charging current, the magnitude of the voltage drop across the parallel combination of resistor 40 and diode 41, and hence the reverse bias on the SCR gate-cathode junction, approaches zero asymtotically.

The quantity of charge developed on the capacitor 36 during the negative one-half cycle B–C, is partially dependent on the voltage between the capacitor terminals in accordance with the relationship $Q=CV$, where Q equals the quantity of charge, C equals the capacitance, and V equals the voltage across the capacitor terminals. The voltage V across the capacitor terminals which are connected to lines 34 and 38 depends upon the size of the resistor 45. Consequently, the charge Q developed on the capacitor 36 during the negative one-half cycle B–C can be regulated by varying the size of the resistor 45. In practice, the resistor 45 should be selected such that sufficient positive charge can be developed on the capacitor 36, that is, such that sufficient electrical energy can be stored in storage circuit 31, during a negative one-half cycle of the source potential to enable the SCR gate 13 to be triggered during positive one-half cycles when the capacitor is discharged, that is, when the stored electrical energy is released.

When the supply potential waveform W shown in FIGURE 7 reaches point C, corresponding to the beginning of the succeeding positive one-half cycle C–D, the bias of SCR 10 switches from reverse to forward while the bias on the diode 30 switches from forward to reverse. This reversal of bias on the diode 30 causes the capacitor 36 to discharge into the gate 13, triggering the SCR 10. Thus, when waveform W reaches point C, the electrical energy stored in the storage circuit 31 during the negative one-half cycle B–C is released and a triggering signal generated. Since the SCR 10 is forward biased by the source 19 at point C, the triggering signal on the gate 13 produced by the discharging of capacitor 36 causes the SCR to latch in a conductive state and thereby energize the load 15.

The exact point at which the SCR latches, it will be understood by those skilled in the art, is slightly beyond point C when the instantaneous SCR anode current magnitude reaches latching current level, that is, the minimum anode current level required for maintaining the SCR conductive following removal of the gate signal. If the load 15 is solely resistive, the load current is exactly in phase with supply potential waveform W, and the latching current level is reached very shortly after the waveform W passes through point C going from negative to positive, that is, after only such a delay as is necessary for the anode current to rise from zero to the latching current level. Consequently, a triggering signal of only short duration is required. If the load 15 contains inductive reactance, the load current lags the supply potential waveform W by some given power factor angle depending on the relating values of the load resistance and inductance. Consequently, the latching current level is reached after a delay which includes an interval corresponding to the power factor angle and an interval equal to the time necessary for the anode current to rise from zero to the latching current level. Thus, with an inductive load, the triggering signal must have a duration which exceeds, by an interval corresponding to the load power factor angle, the duration of the triggering signal required were the load purely resistive. Since capacitors having finite discharge times determined by their initial charge level and the equivalent resistance in their discharge path, the capacitor 36 is selected such that it provides a triggering signal to gate 13 of sufficient duration to at least extend beyond the point in the positive one-half cycle where the instantaneous load current of even the most inductive load reaches the latching current level, thereby providing reliable triggering regardless of variations in load power factor angle.

It is important to note that since the SCR is basically a current device regardless of whether the load is resistive or inductive and regardless of when the switch 37 is closed, the circuit of this invention, because it initiates triggering of the SCR at the zero potential point as the source potential waveform goes from negative to positive, always energizes the load at a point where the load current is approximately zero. Consequently, large current surges are not produced when the switch 37 is closed to initiate conduction of the SCR and energization of the load.

The discharging of the capacitor 36 also causes some current to flow through the resistor 40. However, the current flow through resistor 40 is relatively minor due to the fact that the impedance of resistor 40 is substantially larger than the impedance of the forward biased gate-cathode junction of the SCR 10. The discharge path of the capacitor 36 is completed through the resistor 45. Thus, two capacitor discharge paths can be traced between the capacitor electrode connected to line 38 and the capacitor electrode connected to line 34. One path includes line 38, switch 37, gate-cathode junction of SCR 10, line 14, load 15, line 20, resistor 45, and line 34. The second path includes line 38, switch 37, line 42, resistor 40, line 20, resistor 45, and line 34.

In the preceding example the switch 37 was closed during a positive one-half cycle, such as at point A. In that example it was noted that triggering of the SCR 10 occurred at a point where the supply potential was approximately zero, namely, at point C. The SCR 10 can also be rendered triggered to energize the load 15 at a point where the supply potential is approximately zero by closing the switch 37 at some arbitrary point in a negative one-half cycle such as at point G. Should the switch 37 be closed at point G, the capacitor 36 of the storage circuit 31, which previously was open-circuited, now becomes close-circuited. With the capacitor 36 close-circuited, the diode 30, which is forward biased during negative one-half cycles, permits current to flow through diode 41 and resistor 40 and switch 37 during the one-half cycle B–C to charge the capacitor 36.

At point C corresponding to the beginning of the positive one-half cycle C–D the SCR 10 becomes forward biased and the diode 30 reverse biased. The reverse biasing of the diode 30 enables the capacitor 36 to discharge into the gate 13, releasing the energy stored in the storage circuit 31, for providing the triggering signal for the SCR 10. The triggering signal is effective, in the manner described previously, in conjunction with closing the switch 37 at point A, to render the SCR 10 conductive at some point, after point C where triggering is initiated, when the SCR anode current reaches the latching level. Thus, regardless of whether the switch 37 is closed during a positive one-half cycle, such as at point A, or during a negative one-half cycle, such as at point G, the triggering circuit 28 is effective to trigger the SCR 10, rendering it conductive for energizing the load 15, at a zero point in the supply waveform W.

The SCR 10, once fired during the positive one-half cycle C–D at approximately point C, continues conducting for the remainder of the positive one-half cycle C–D until it is turned-off at point D when the forward bias provided by source 19 approaches zero and the SCR current drops below the holding current necessary to sustain conduction. The fact that the capacitor 36 may fully discharge, terminating the triggering signal before point D is reached, does not render the SCR 10 nonconductive once it has become conductive at approximately point D.

When the source waveform W depicted in FIGURE 7 passes through the point D, in addition to the SCR 10 becoming reverse biased and thereby terminating conduction and de-energizing the load 15, the diode 30 becomes forward biased. The forward biasing of the diode 30 is effective to allow current to flow through the path including resistor 40 and diode 41 and switch 37 to charge the capacitor 36 to the polarity shown and reverse bias the junction formed by the gate 13 and cathode 12 of the SCR 10 in a manner described in conjunction with the negative one-half cycle B–C.

Thus, during the negative one-half cycle D–E energy is stored in the energy storage circuit 31 by the charging of capacitor 36 in the same manner that energy was stored in the storage circuit by the charging of the capacitor 36 during the negative one-half cycle B–C. The energy stored in the storage circuit 31 during the negative one-half cycle D–E is released at the beginning of the succeeding positive one-half cycle, namely, at the point E when the capacitor 36 discharges into the gate 13 of the SCR 10, triggering the SCR which becomes conductive as a consequence of simultaneously being forward biased by the source 19. The sequence of alternate SCR triggering and consequent conduction and energization of the load 15 on a one-half wave rectified basis during positive one-half cycles beginning and ending at approximately zero supply potential points, and energy storage in the storage circuit 31 during negative one-half cycles followed by subsequent release thereof to trigger the SCR 10 at the beginning of positive one-half cycles, continues until the switch 37 is opened.

The switch, since opened at random by the operator, can be opened during either a positive one-half cycle or a negative one-half cycle. If the switch 37 is opened during a positive one-half cycle, such as at some arbitrary point H, the rectifier 10 does not immediately cease conducting for the remainder of the positive one-half cycle F–K since once the SCR 10 becomes conductive the gate 13 exerts no control over SCR conduction or nonconduction. Instead, the SCR 10 continues to conduct until the end of positive one-half cycle F–K whereupon it ceases to conduct when reverse biased.

Opening of the switch 37 during a positive one-half cycle is effective, however, to disable the energy storing function of the storage circuit 31 and thereby prevent the SCR 10, once rendered nonconductive at point K by the reversal of bias thereacross, from becoming conductive once again at point L corresponding to the beginning of the positive one-half cycle L–M. Specifically, with switch 37 opened at point H, the capacitor 36 is unable to store energy as it normally does during negative one-half cycles when the switch 37 is closed. Upon the completion of the negative one-half cycle K–L immediately following the closing of switch 37, the capacitor 36 is not charged. Consequently, when the diode 30 becomes again forward biased at point L, the capacitor 36 does not discharge into the gate 13, and no triggering signal is provided to render conductive the now forward biased SCR 10 for the positive one-half cycle L–M. Neither does the SCR 10 conduct for the positive one-half cycles subsequent to one-half cycle L–M as long as the switch 37 remains open. Thus, the load, which was de-energized at a zero load current point, namely, at point K, remains de-energized.

Opening the switch 37 at some arbitrary point H during a positive one-half cycle, as discussed immediately above, effectively insures de-energization of the load 15 at a zero current point. The same result is produced when the switch 37 is opened during a negative one-half cycle such as at arbitrary point N. Specifically, if switch 37 is closed at point N during negative one-half cycle M–P the SCR 10, which has ceased conducting at point M corresponding to the end of the positive one-half cycle L–M when it became reverse biased, does not again conduct at point P corresponding to the beginning of the succeeding positive one-half cycle P–Q. This results because, at point P the capacitor 36 is open-circuited, the switch 37 having been opened at point N. With the capacitor 36 open-circuited at point P corresponding to the beginning of the succeeding positive one-half cycle P–Q following the opening of the switch 37, the capacitor 36 is unable to discharge into the gate 13 of the now forward biased SCR 10 to apply a triggering signal and thereby render the SCR conductive.

Opening switch 37 at point N discharges any charge accumulated on capacitor 36 during the interval M–N. In addition, opening switch 37 at point N prevents the storage of energy during subsequent negative one-half cycles. In the absence of energy storage during negative one-half cycles, the storage circuit 31 is unable to provide on gate 13 triggering signals necessary to render the SCR conductive at the beginning of subsequent positive one-half cycles. Thus, the SCR 10 remains nonconductive and the load 15 de-energized until the switch 37 is once again closed to initiate conduction in the manner described previously.

It is significant that regardless of whether the switch 37 is opened at a point in a positive one-half cycle, such as point H, or a point in a negative one-half cycle, such as point N, the SCR 10 ceases conduction and de-energizes the load 15 at an approximately zero current point, namely, at point K or point M, respectively.

Figure 3:
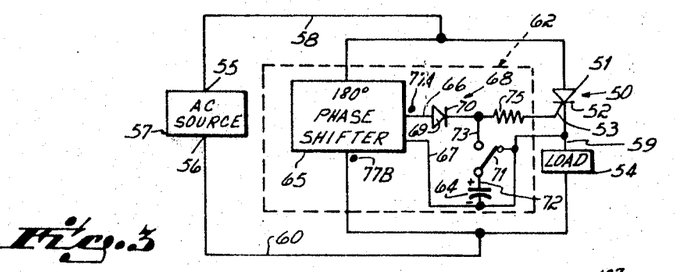
FIGURE 3 is a still further embodiment of a control circuit suitable for triggering a silicon controlled rectifier in series with a load at a zero point independent of when in the supply potential waveform a switch is actuated.

A second embodiment of a control circuit operating in accordance with the principles of this invention is depicted in FIGURE 3. Referring to this figure, the control circuit is seen to include an SCR 50 having an anode 51, a cathode 52, and a gate 53. The SCR 50 may be of any conventional type, and preferably is constructed similar to SCR 10 described in conjunction with control circuit of FIGURE 1. The SCR 50 is adapted to be connected in series with a load 54 between the terminals 55 and 56 of a conventional alternating current source 57 via a line 58 connecting supply terminal 55 and SCR anode 51, a line 59 connecting one side of the load 54 and SCR cathode 52, and a line 60 connecting the other side of the load and supply terminal 56. With the SCR 50 connected as described, the junction formed by the SCR anode 51 and cathode 52 is alternately forward and reverse in synchronism with the positive and negative alternations in potential of the supply terminal 55 with respect to the supply terminal 56.

A trigger circuit 62 is provided to supply the necessary triggering signals to the SCR gate 53 for enabling the SCR 50 to initiate and terminate conduction when the load current is approximately zero. The trigger circuit 62 includes an energy storage device or capacitor 64 which is adapted to store electrical energy during negative one-half cycles when the SCR 50 is reverse biased, and to release stored energy for triggering the SCR when the SCR becomes forward biased. The trigger circuit 62 also includes a phase shifter 65 which is adapted to permit the storage device 64, during negative one-half cycles, to store charge having a polarity appropriate for triggering the SCR 50 during positive one-half cycles.

The phase shifter 65 is connected across the supply terminals 55 and 56 of the source 57 and provides across its output lines 66 and 67 a signal which is phase shifted approximately 180 electrical degrees with respect to the signal input thereto from the source 57. For example, when the supply terminal 55 is positive with respect to the supply terminal 56, the output terminal 66 is negative with respect to the output terminal 67. For convenience, input and output terminals of the phase shifter 65 having the same polarity are designated by dots 77A and 77B.

The capacitor 64 is connected across the phase shifter output lines 66 and 67 via an electrical path which includes a line 72, a switch 71, a line 73, and a diode 68 having an anode 69 connected to the line 66 and a cathode 70 connected to the line 73. With the diode 68 so connected the diode is forward biased when the SCR 50 is reverse biased. A current limiting resistor 75 is connected between line 73 and the SCR gate 53 to prevent damage to the SCR 50.

In operation, when the switch 71 is in the open position shown in FIGURE 3, the capacitor circuit 64 is open-circuited, preventing the capacitor 64 from storing electrical energy of any polarity. In addition, with switch 71 in the open position, the terminals of the capacitor 64 are short-circuited discharging any charge on the capacitor accumulated prior to opening the switch. Consequently, with the switch 71 open, the presence of the capacitor 64 in the triggering circuit 62 may be ignored. When the SCR 50 is forward biased during positive one-half cycles by the source 57, that is, when the potential of the anode 51 is more positive than the potential of the cathode 52, the phase shifter 65 reverse biases the junction formed by the SCR gate 53 and cathode 52, that is, causes the gate 53 to be more negative than the cathode 52. With the SCR gate-cathode junction reverse biased during positive one-half cycles due to the open condition of the switch 71, the SCR 50, although forward biased during positive one-half cycles, is not rendered conductive. During negative one-half cycles, the SCR 50 anode-cathode junction is reverse biased and for this reason is not rendered conductive notwithstanding the application of a forward bias to the gate-cathode junction by the phase shifter 65. Thus, the SCR 50 does not conduct during either positive or negative one-half cycles of supply potential.

To energize the load 54, the switch 71 is closed. The switch 71, since it is closed at random, may be closed either during a positive one-half cycle or a negative one-half cycle. For illustrative purposes, it is first assumed that the switch 71 is closed during a positive one-half cycle such as at some arbitrary point A in the plot W of supply potential versus time as depicted in FIGURE 7. When the switch is closed at point A in the positive one-half cycle O–A, the SCR 50 is forward biased, that is, the anode 51 is positive with respect to the cathode 52. However, the SCR 50 is unable to be rendered conductive since the gate-cathode junction is reverse biased by the phase shifter output on lines 66 and 67. The diode 68 during the positive one-half cycle O–A is reverse biased by the phase shifter 65 preventing the capacitor 64 from accumulating a charge of any polarity.

When the waveform W of FIGURE 7 begins the negative one-half cycle starting at point B, the SCR 50 is reverse biased by the supply 57 and does not conduct. During the negative one-half cycle B–C, the rectifier 68 of the trigger circuit 62 is forward biased by the output of the phase shifter 65. With the rectifier 68 forward biased, the capacitor 64 charges through diode 68 and switch 71 with the polarity shown in FIGURE 3. Thus, during the negative one-half cycle B–C energy is stored in the capacitor 64.

The energy stored in the capacitor 64 is released to generate a triggering signal on gate 53 during the beginning of the succeeding positive one-half cycle C–D when the source 57 forward biases the SCR anode-cathode junction and the phase shifter reverse biases the diode 68. Specifically, at point C corresponding to the beginning of the positive one-half cycle C–D immediately following the negative one-half cycle B–C during which energy was stored in the capacitor 64, the capacitor discharges through the resistor 75 into the gate SCR 53 triggering the SCR 50, the diode 68 preventing discharge into the phase shifter 65. Since the SCR 50 is forward biased during the positive one-half cycle C–D by the supply 57, the application to the gate 53 of a triggering signal at point C is effective to render the SCR 50 conductive. With the rectifier 50 conductive, the load 54 is energized.

The resistor 75 connected in the discharge path of the capacitor 64, in addition to its protection feature, functions to regulate the discharge rate of the capacitor 64 during the positive one-half cycle C–D. This insures that a triggering signal is present on gate 53 for a duration sufficient to allow the SCR anode current to reach the latching current valve necessary for sustaining conduction prior to termination of substantial capacitor discharge.

The SCR 50 continues conducting during the positive one-half cycle C–D. At point D, corresponding to the beginning of the negative one-half cycle D–E, the SCR anode-cathode junction becomes reverse biased, rendering the SCR 50 nonconductive and de-energizing the load 54. During the succeeding negative one-half cycle D–E, the SCR anode-cathode junction remains reverse biased. However, the diode 68 is forward biased. With the diode 68 forward biased, the capacitor 64 charges to the polarity shown, storing electrical energy during negative one-half cycle D–E. This energy is released at the beginning of the succeeding positive one-half cycle, namely, at point E. When point E is reached, corresponding to the beginning of the positive one-half cycle E–F, the capacitor 64 discharges through the resistor 75 into the gate 53, providing a triggering signal to gate 53 which is effective to render the SCR 50 conductive in a manner similar to that described with respect to the release of energy and the triggering of the SCR gate 53 at point C. The SCR 50 again conducts, energizing the load 54 for a positive one-half cycle, namely, the positive one-half cycle E–F. At point F, the SCR 50 becomes reverse biased and is rendered nonconductive, de-energizing the load 54 at a zero current point. The sequence of storing energy in the capacitor 64 during negative one-half cycles for release into the gate 53 during positive one-half cycles to trigger the SCR 50 and thereby render it conductive to energize the load 54 on a one-half wave rectified basis continues during subsequent cycles of the source waveform W of FIGURE 7 until the switch 71 is opened.

In the foregoing example, it was assumed that the switch 71 was closed at some arbitrary point A in a positive one-half cycle of the waveform W of FIGURE 7. Assume that the switch 71, instead of being closed during a positive one-half cycle, is closed during a negative one-half cycle, such as at some arbitrary point G in negative one-half cycle B–C. When the switch 71 is closed at point G, the SCR 50 is reverse biased and therefore cannot be rendered conductive. However, the diode 68 is forward biased enabling the capacitor 64 to store energy during the remaining portion G–C of the negative one-half cycle B–C. Thus, during the negative one-half cycle G–C, the capacitor 64 charges to the polarity shown in FIGURE 3.

When the waveform W reaches point C, the SCR 50 is forward biased. In addition, the diode 68 is reverse biased causing capacitor 64 to discharge through the resistor 75 into the gate 53 of the SCR 50, providing a triggering signal for rendering conductive the forward biased SCR 50. With the SCR 50 rendered conductive, the load 54 is energized. The SCR 50 continues to conduct for the positive one-half cycle C–D. At point D, the SCR is rendered nonconductive and the load 54 thereby de-energized when its bias changes from forward to reverse, and the capacitor 64 begins charging. This sequence of SCR conduction and load energization on a one-half wave rectified basis during positive one-half cycles and energy storage during negative one-half cycles for subsequent release and triggering of the SCR at the beginning of positive one-half cycles continues until the switch 71 is opened.

The switch 71 may be opened during either a positive one-half cycle or a negative one-half cycle. If the switch 71 is opened during a positive one-half cycle, such as at some arbitrary point H, the SCR 50 continues conducting until the end of the positive one-half cycle, that is, until point K is reached whereupon the SCR becomes reverse biased and is rendered nonconductive to de-energize the load 54 at a zero current point. During the succeeding negative one-half cycle K–L, no electrical energy is stored in the capacitor 64, since the capacitor circuit is opened by the switch 71. Consequently, upon completion of the negative one-half cycle K–L, although the SCR 50 is again forward biased, the capacitor 64 does not discharge and no triggering signal is applied to the SCR gate 53. Thus, during the positive one-half cycle L–M, as well as during successive positive one-half cycles, the SCR 50, although forward biased by the source 57, is not rendered conductive to energize the load 54 due to the absence of a triggering signal at gate 53, the triggering signal being absent due to the failure of the capacitor 64 to store energy during preceding negative one-half cycles.

If instead of opening the switch 71 at some arbitrary point H in a positive one-half cycle, the switch 71 is opened at some arbitrary point N in a negative one-half cycle, the load 54 is nevertheless de-energized at a zero current point. Specifically, if the switch 71 is opened at point N during the negative one-half cycle M–P, the capacitor 64 is unable to discharge through the resistor 75 into the gate 53 to trigger the SCR 50 when point P is reached corresponding to the beginning of the succeeding positive one-half cycle P–Q. Thus, the SCR 50, which has ceased conducting at point M due to the reversal of bias produced by the supply 57, is unable to be rendered conductive at point P for the succeeding positive one-half cycle P–Q and thereby energize the load 54. For the same reason, namely, failure of the capacitor 64 to produce triggering signals, the SCR 50 is not rendered conductive to energize the load 54 during positive one-half cycles subsequent to one-half cycle P–Q. Thus, the opening of switch 71 at some arbitrary point N in a negative one-half cycle is effective to terminate energization of the load 54 at a zero current point, namely, point M.

In addition, opening switch 71 at point N discharges any charge accumulated on the capacitor during the interval M–N.

As those skilled in the art will understand, the exact point in waveform W at which the forward biased SCR 50 latches once triggered depends upon the latching current level characteristics of the SCR as well as the nature of the impedance of the load 54. As a general rule, the more inductive the load 54 and the higher the latching current of SCR 50, the greater the delay between the triggering of SCR 50 and the latching thereof.

It is significant to note that regardless of when the switch 71 is closed to render conductive the SCR 50 and thereby energize the load 54, that is, during either an arbitrary point in a negative or positive one-half cycle, the SCR is triggered at a zero point in the supply waveform W, and the SCR rendered conductive and the load energized. Likewise, regardless of when the switch 71 is opened, that is, at either an arbitrary point during a positive one-half cycle or a negative one-half cycle, the SCR is rendered nonconductive and the load 54 is de-energized at a zero current point.

Figure 5:
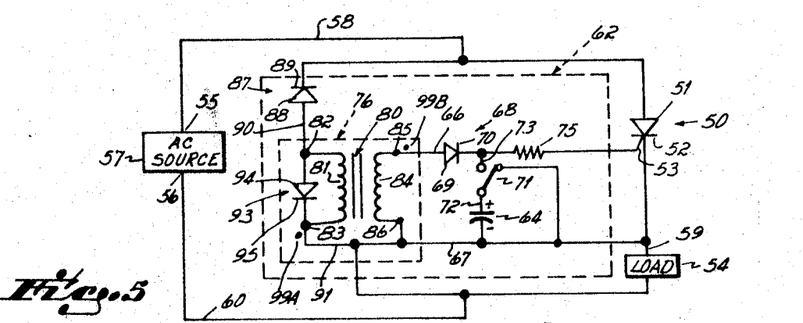
FIGURE 5 is another embodiment of a control circuit for energizing a load for a predetermined interval beginning and ending at a zero point, which is independent of the point in the supply potential waveform when the switch is actuated to initiate the energization invteral.

FIGURE 5 depicts a control circuit embodiment utilizing a transformer as a phase shifter which is constructed in accordance with the general principles of the circuit of FIGURE 3. In the circuit of FIGURE 5, circuit elements bearing reference numerals identical to circuit elements depicted in FIGURE 3 are of similar construction to their identically numbered counterparts in FIGURE 3.

The control circuit of FIGURE 5 includes a phase shifter 76 which, like the phase shifter 65 of FIGURE 3, is connected across the output terminals 55 and 56 of the supply 57 by the lines 58 and 60. In addition, the phase shifter 76 of FIGURE 5, like the phase shifter 65 of FIGURE 3, has a pair of output lines 66 and 67 which are connected to the anode 69 of diode 68 and to the capacitor 64, respectively. Functionally, the phase shifter 76 is similar to the phase shifter 65. Specifically, the phase shifter 76 permits the capacitor 64 to store energy when the switch 71 is closed during negative one-half cycles and to release stored energy into the gate 53 of the SCR 50 during positive one-half cycles for triggering the SCR and thereby rendering it conductive to energize the load 54.

The phase shifter 76 considered in more detail includes a transformer 80 having a primary winding 81 provided with terminals 82 and 83, and a secondary winding 84 having terminals 85 and 86. The secondary winding terminal 85 is connected to the anode 69 of diode 68 by the line 66. The secondary winding terminal 86 is connected to the capacitor 64, and to the line 59 via the line 67. The primary winding terminals 82 and 83 are respectively connected to the supply terminals 55 and 56 via a line 90, a diode 87 and the line 58, and via the line 60, respectively. The diode 87 is connected such that it is poled oppositely with respect to the SCR 50. That is, the diode 87 is connected such that the junction formed by its anode 88 and its cathode 89 is reverse biased when the SCR anode-cathode junction is forward biased.

The terminals 83 and 86 of the primary and secondary windings 81 and 84, respectively, are connected via a line 91. A diode 93 is connected across the primary winding 81 and has its anode 94 connected to terminal 82 and its cathode 95 connected to terminal 83. The transformer 80 is wound such that the phase of the output provided across the secondary winding terminals 85 and 86 is phase shifted 180 electrical degress with respect to the phase provided at the input terminals 82 and 83 of the primary winding 81. For clarity, terminals 83 and 85, having like polarity, are provided with dots 99A and 99B, respectively.

When the switch 71 is open, the capacitor circuit 64 is open-circuited and no charge can accumulate on the capacitor. In addition, the capacitor 64 is discharged by reason of its terminals being short-circuited with switch 71 open. When it is desired to energize the load 54 the switch 71 is closed. If the switch 71 is closed during a positive one-half cycle, such as at point A in the waveform W depicted in FIGURE 7, the SCR 50 is forward biased, but cannot conduct during this positive one-half cycle due to the absence of a triggering signal on gate 53. At the instant of switch closure, namely, at point A, the capacitor 64 is uncharged and consequently the mere closing of the switch 71 is insufficient to provide a triggering signal on gate 53. In addition, when the switch 71 is closed during a positive one-half cycle, such as at point A, the diode 87 is reverse biased by the source 57 and no current flows in the primary winding 81 of the transformer 80. Consequently, no signal appears across the terminals 85 and 86 of the secondary winding 84 to produce a triggering signal.

At point B, corresponding to the beginning of the negative one-half cycle B–C, the diode 87 becomes forward biased enabling an output to be produced across secondary winding terminals 85 and 86 having a polarity which forward biases the diode 68 enabling the capacitor 64 to charge. The capacitor 64 continues to charge with the polarity shown in FIGURE 5 during the negative one-half cycle B–C. During this negative one-half cycle the SCR 50 is reverse biased by the source 57 and consequently is unable to be rendered conductive.

At point C, corresponding to the beginning of the positive one-half cycle C–D, the rectifier 87 becomes reverse biased and the SCR 50 becomes forward biased. Under these conditions, the capacitor 64 releases the energy which was stored during the preceding negative one-half cycle B–C, discharging through resistor 75 into the gate 53, providing a triggering signal which renders the SCR 50 conductive, in turn energizing the load 54. Diode 68 prevents capacitor 64 from discharging into the transformer secondary winding 84. The SCR 50 continues conducting, energizing the load 54, throughout the positive one-half cycle C–D.

At point D, the SCR 50 is reverse biased by the source 57 and ceases conduction, de-energizing the load 54 at a zero current point. In addition, at point D, the diode 87 becomes forward biased enabling the transformer 80 to provide across secondary winding terminals 85 and 86 a phase shifted signal which forward biases the diode 68 permitting the capacitor 64 to once again store energy. At point E, corresponding to the beginning of the positive one-half cycle E–F, the SCR 50 is again forward biased and the diode 87 reverse biased. Under these conditions, the SCR 50 is triggered and conducts to energize the load 54 in a manner described with respect to the conduction of the SCR 50 at point C.

The SCR 50 can also be triggered and rendered conductive by closing the switch 71 during a negative one-half cycle. For example, the SCR 50 can be triggered at point C and rendered conductive by closing the switch 71 during some arbitrary point in the negative one-half cycle B–C such as at point G. When the switch 71 is closed at point G, the SCR 50 is reverse biased and therefore cannot be rendered conductive. However, the rectifier 87 is forward biased enabling the transformer 80 to provide across secondary winding terminals 85 and 86 a phase shifted potential for forward biasing the diode 68 and thereby enabling the capacitor 64 to store energy during the remainder G–C of the negative one-half cycle B–C.

At point C, corresponding to the beginning of the positive one-half cycle C–D, the SCR 50 becomes forward biased and the capacitor 64 discharges into the gate 53 via resistor 75. When this occurs, a triggering signal is produced which causes the forward biased SCR 50 to conduct and thereby energize the load 54. Thus, it is seen that SCR 50 can be triggered at point C and the load 54 energized by closing the switch 71 during any arbitrary point in either a positive one-half cycle or a negative one-half cycle.

The exact latching point for SCR 50 relative to the zero potential point where the SCR is triggered, as described earlier in connection with the circuit of FIGURE 3, depends on the load impedance and the SCR characteristics, occurring later in the positive one-half cycle for loads with more inductance and SCR's with higher latching current levels.

The sequence wherein the SCR 50 conducts during positive one-half cycles to energize the load on a one-half wave rectified basis, and the capacitor 64 stores energy during negative one-half cycles for subsequent triggering of the SCR continues until the switch 71 is opened. If the switch 71 is opened during some arbitrary point in a positive one-half cycle, such as point H, the SCR continues conducting until point K when it becomes reverse biased by the source 57. The SCR 50, however, is not rendered conductive at point L corresponding to the beginning of the succeeding positive one-half cycle. This failure to be rendered conductive at point L is caused by the inability of the capacitor 64 to store energy during the negative one-half cycle K–L, the capacitor circuit 64 being open-circuited by switch 71. Since the capacitor 64 is unable to store energy during the negative one-half cycle K–L, it is unable at point L to discharge into the gate 53 and provide a triggering signal for rendering the SCR 50 conductive and the load thereby energized during the succeeding positive one-half cycle L–M. For the same reason, the load is not energized during positive one-half cycles subsequent to L–M, such as P–Q.

If instead of opening the switch 71 at some arbitrary point in a positive one-half cycle, such as point H, the switch 71 is opened at some arbitrary point in a negative one-half cycle, such as point N, the load is still de-energized at a zero potential point. Specifically, if the switch 71 is opened at point N in the negative one-half cycle M–P, the capacitor 64 is open-circuited and can no longer release electrical energy by discharging through the resistor 75 into the gate 53 to provide a triggering signal to render conductive the SCR 50 and thereby energize the load 54. Thus, when the waveform of the supply 57 reaches point P and the SCR 50 is forward biased, no capacitor discharge results and consequently no triggering signal is applied to gate 53 to render the SCR 50 conductive and energize the load.

Opening switch 71 at point N also discharges any charge accumulated on the capacitor 64 during the interval M–N.

The diode 93 is provided to load the primary winding 81 of the transformer 80. Such loading retards the rate at which the field in the primary winding collapses during the latter portion of a negative one-half cycle when the magnitude of the source potential is approaching zero. By reducing the rate at which the field in the primary winding 81 collapses, the peak voltages induced across the terminals 85 and 86 of the secondary winding 84 can be lowered. By lowering the peak induced voltage output at terminals 85 and 86 of the secondary winding 84, high frequency transient signals in the triggering circuit are minimized, reducing the possibility of falsely triggering the SCR 50.

The diode 87 is provided to prevent a triggering signal from being produced at gate 53 to render the SCR 50 conductive and thereby energize the load 54 should the switch 71 be closed at a non-zero source potential point during a positive one-half cycle when the SCR 50 is forward biased. Due to operating characteristics inherent in certain transformer designs, for each positive one-half cycle of sinusoidal voltage input to the primary winding of the transformer, it is possible to have provided at the output of the secondary winding 84 of the transformer 80 both a positive signal and a negative signal. By positive and negative signal is meant that the secondary winding terminal 85 is positive and negative, respectively, relative to the secondary winding terminal 86. The negative signal is produced as a consequence of the return of the input potential waveform to zero during the latter portion of the positive one-half cycle.

The presence of a negative signal output from the secondary winding 84 of the transformer during a positive one-half cycle, produced as a consequence of closing the switch 71 during a positive one-half cycle at a time when the SCR 50 is forward biased, makes it possible to trigger the SCR 50 during the positive one-half cycle of switch closure rendering the forward biased SCR conductive and thereby energizing the load. Unfortunately, energization of the load is not at a zero potential point, but rather is at some point in the latter portion of the positive one-half cycle of switch closure when the source potential is returning to zero. The diode 87 avoids the possibility of non-zero load energization by switch closures during positive one-half cycles. Specifically, the diode 87, by preventing the application of any input to the phase shifted 76 during the positive one-half cycle when SCR 50 is forward biased, eliminates the possibility, should the switch 71 be closed during a positive one-half cycle, that the secondary winding 84 provides a triggering signal to the SCR to render the forward biased SCR conductive and the load energized at a non-zero potential point in the positive one-half cycle of switch closure.

Figure 2:
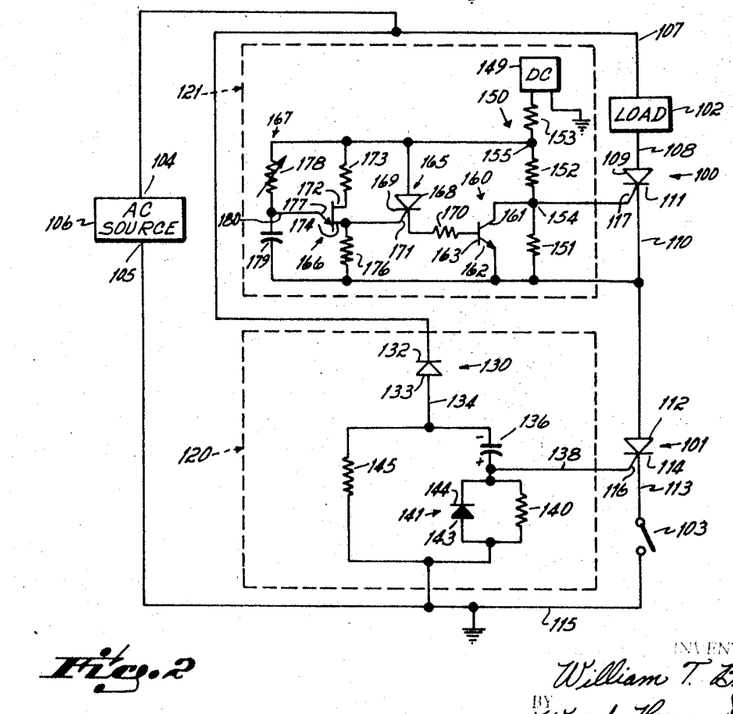
FIGURE 2 is another embodiment of a control circuit suitable for triggering a silicon controlled rectifier in series with a load at a zero point independent of when in the supply potential waveform a switch is actuated.

In FIGURE 2 a control circuit embodiment is shown for triggering an SCR through which the load is energized for a predetermined and automatically timed interval beginning and ending at points where the SCR anode-cathode potential is zero. The control circuit includes a first SCR 100 through which the load 102 is energized and a second SCR 101. The SCR's 100 and 101 are adapted to be connected in series with the load 102 between terminals 104 and 105 of an alternating current source 106. The series connection is made via a line 107 connected between one side of the load 102 and the supply terminal 104, a line 108 connected between the other side of the load 102 and an anode 109 of the SCR 100, a line 110 connected between a cathode 111 of the SCR 100 and the anode 112 of the SCR 101, a line 113 connected between the cathode 114 of SCR 101 and a switch 103, and a grounded line 115 connected between the switch 103 and the supply terminal 105.

A first triggering circuit 120 interconnecting the supply terminals 104 and 105 and a gate 116 of the SCR 101 is provided for triggering the SCR 101 at a zero supply potential point, which in turn starts the timing interval and applies a triggering signal to the gate 117 of SCR 100 at a point when the SCR anode-cathode potential is zero to enable SCR 100 to conduct and thereby energize the load on a one-half wave rectified basis. A second triggering circuit 121 is provided to terminate, after expiration of the predetermined timing interval, the triggering signal which is applied to the gate 117 of SCR 100 in response to the conduction of SCR 101, thereby enabling the load to be de-energized both after a predetermined interval and at a point when the anode-cathode potential of SCR 100 is zero.

The triggering circuit 120 of FIGURE 2 is structurally identical to the triggering circuit 28 of FIGURE 1, except that the former is not provided with a switch. The triggering circuit 120 includes a diode 130 having an anode 133 connected to a line 134 and a cathode 132 connected to the line 107. The anode 130 is poled oppositely with respect to the SCR 100. A capacitor 136 is provided having one terminal connected to the line 134 and its other terminal connected to the gate 116 via a line 138 and to the supply terminal 105 via the line 138, the parallel combination of a resistor 140 and a diode 141, and the line 115. The diode 141 has an anode 143 connected to the supply terminal 105 and a cathode 144 connected to the line 138. With the diode 141 so connected, the diode is poled oppositely with respect to the SCR 100.

A resistor 145 is provided to complete a discharge path for the capacitor 136 when the diode 130 is reverse biased during negative one-half cycles. The resistor 145 has one side connected to one terminal of the capacitor 136 via a line 134 and its other side connected to the other terminal of the capacitor via the line 115, the parallel combination of the resistor 140 and the diode 141, and the line 138.

The triggering circuit 121 includes a voltage divider 150 connected between the positive terminal of a source of direct current potential 149 and the line 110. The divider functions to apply a triggering signal to gate 117 of SCR 100 for a predetermined interval in response to conduction of SCR 101. The voltage divider 150 includes a lower portion 151, an intermediate portion 152, and upper portion 153 separated, respectively, by tap points 154 and 155. The lower end of the divider portion 151 is connected to the cathode 111 of SCR 100 and to the anode 112 of SCR 101 via the line 110. The upper end of the divider portion 151 is connected to the gate 117 of the SCR 100 via tap point 154. A transistor 160 having its collector 161 connected to tap point 154 and its emitter 162 connected to line 110 is provided to selectively short-circuit the lower divider portion 151 at the end of the timing interval when the transistor is driven into conduction by an appropriate signal input to the transistor base 163, thereby effectively short-circuiting the junction formed by the gate 117 and the cathode 111 of the SCR 100.

For latching the transistor 160 in the conductive condition at the end of the timing interval, an SCR 165 is provided which is triggered by a unijunction transistor 166 under the action of an R-C timing network 167. The SCR 165 includes an anode 168 connected to the tap point 155, a cathode 169 connected to the transistor base 163 via a coupling resistor 170, and a gate 171. The unijunction transistor 166 includes an emitter 177 responsive to the R-C timing network 167, a first base 172 connected to the tap point 155 via a resistor 173, and a second base 174 connected to both the gate 171 of the SCR 165 and the line 110 via a resistor 176.

The R-C timing network 167 includes the series combination of a resistor 178 and a capacitor 179 connected between the tap point 155 and the line 110. The timing circuit 167 has an output line 180 connected to the emitter 177 of the unijunction transistor 166 for momentarily firing the unijunction transistor when the R-C timing interval, which begins when SCR 101 conducts, terminates. The unijunction transistor in turn triggers the SCR 165 causing it to latch in a conductive state, in turn driving and maintaining transistor 160 in a conductive state to short-circuit the gate-cathode junction of SCR 100 and thereby remove the triggering signal from gate 117.

In operation when the switch 103 is in the open position the SCR's 100 and 101 do not conduct and, therefore, no current flows through the load 102. In addition, with the SCR 101 nonconductive, no current flows from the positive terminal of the source 149 through the divider 150. Consequently, the line 110 is positive with respect to the grounded line 115. With the line 110 positive with respect to the grounded line 115, the junction formed by the anode 112 and the cathode 114 of the SCR 101 will become forward biased when the switch 103 is closed. However, mere closure of the switch 103 is not sufficient to cause the SCR 101 to conduct, it being also necessary to simultaneously provide a triggering signal to gate 116.

With switch 103 open and no current flowing through the divider 150, substantially no voltage drop appears across the lower divider portion 151. Consequently, the gate 117 and the cathode 111 of the SCR 100 are at substantially the same potential and the SCR 100 will not become conductive when forward biased as, for example, by closing the switch 103 during a positive one-half cycle.

With the switch 103 open and the supply 106 operative, the capacitor 136 of the trigger circuit 120 charges during negative one-half cycles, such as cycle B-C of waveform W depicted in FIGURE 7, and discharges during positive one-half cycles such as cycle C-D of FIGURE 7. The capacitor 136 charges through the parallel path including forward biased diode 141 and resistor 140, and forward biased diode 130; and discharges through the path including resistor 145, diode 141, and resistor 140. However, the cyclic charging and discharging of the capacitor 136 in synchronism with the negative and positive one-half cycles is ineffective to render the SCR 101 conductive as long as switch 103 remains open.

To energize the load 102, the switch 103 is closed. Since the switch 103 is closed at random, it may be closed either during a positive one-half cycle or a negative one-half cycle. Assume the switch 103 is closed during some arbitrary point A in a positive one-half cycle O-B. When the switch 103 is closed, an electrical path is completed from the positive terminal of direct current source 149 through the divider 150 and SCR 101 to the grounded line 115. Completion of this path forward biases the junction formed by the anode 112 and the cathode 114 of SCR 101. However, SCR 101 does not conduct due to the absence of a triggering signal on its gate 116.

Completion of the path through divider 150 reverse biases the gate1cathode junction of the SCR 100. Reverse biasing of the gate-cathode junction of SCR 100 is produced by the absence of a voltage drop across divider portion 151 due to the absence of current flow through the divider 150 in the rectifier 101, there being no current flow inasmuch as SCR 101 is not conducting. Absent a voltage drop across divider portion 151, the gate 117 and the cathode 111 are at substantially the same potential and the SCR 100 cannot be rendered conductive notwithstanding that during the positive one-half cyclo O-B, the anode-cathode junction of SCR 100 is forward biased by the supply 106.

With line 110 at the same potential as the positive terminal of source 149, caused by the absence of current flow through the divider 150 due to nonconduction of SCR 101, the capacitor 179 of R-C timing network 167 does not begin to charge. Hence, the timing interval of R-C network 167 is not initiated at this point, notwithstanding closure of switch 103.

At point B of the waveform W, corresponding to the beginning of the negative one-half cycle B-C, the source 106 reverse biases the anode-cathode junction of the SCR 100 preventing this SCR from conducting during the negative one-half cycle B-C should a triggering signal be present at gate 117. The negative one-half cycle B-C is ineffective to reverse bias the SCR 101. No current flows in the divider 150 and, consequently, the positive potential of the source 149 is applied to the anode 112 of the SCR 101, forward biasing this anode with respect to the grounded cathode 114. The capacitor 179 of timing network 167 is still not charging and the timing interval, therefore, is not yet initiated.

In addition, during the negative one-half cycle B-C, the diode 130 is forward biased, enabling current flow through the parallel path including diode 141 and resistor 140 to charge the capacitor 136 with the polarity shown in FIGURE 2, thereby storing electrical energy. During the negative one-half cycle B-C, when the capacitor 136 is charging, a voltage drop is produced across the resistor 140 and diode 141 which is effective to reverse bias the junction formed by the gate 116 and the cathode 114 of SCR 101, preventing SCR 101 from being triggered during the negative one-half cycle B-C.

When the voltage waveform reaches point C, corresponding to the beginning of the positive one-half cycle C-D, the anode-cathode junction of SCR 100 is forward biased by the source 106. With the anode-cathode junction of SCR 100 forward biased, conduction can occur should the gate-cathode junction of SCR 100 become forward biased by developing a voltage drop across resistor 151. Such a drop is produced when the SCR 101 begins conducting in a manner to be described.

At point C, corresponding to the beginning of positive one-half cycle C-D, the source 106 also reverse biases the diode 130. With the diode 130 reverse biased, the stored energy in the capacitor 136 is released. Specifically, at point C the capacitor 136 discharges into the gate 116 of the SCR 101, providing a triggering signal which is effective to render conductive this SCR which is forward biased by the positive terminal of the direct current potential source 149. The conduction of SCR 101 is effective to bring the potential of line 110 to substantially the same potential as line 115, causing current to flow through the divider 150. Current flows through the divider 150 produces a voltage drop across divider portion 151 which biases the junction formed by the gate 117 and the cathode 111 of the SCR 100, triggering SCR 100. SCR 100 becomes conductive when triggered as a consequence of being forward biased by the source 106. Conduction of SCR 100 energizes the load 102. When SCR 101 conducts, bringing line 110 to substantially the same potential as line 115, the capacitor 179 begins to charge through resistor 178 initiating the timing interval established by the R-C timing network 167.

Thus, at zero potential point C, SCR 101 and SCR 100 are successively triggered and latched in a conductive state for energizing the load 102 and initiating the timing interval. Triggering of SCR 101 is produced by the release of energy via the discharge of capacitor 136, which energy was stored during the preceding negative one-half cycle B–C. Triggering of SCR 100 is produced by the flow of current through the divider 150 occasioned by the conductive condition of SCR 101.

The SCR 100 can also be rendered conductive at the zero potential point C should the switch 103 be closed during the negative one-half cycle B–C, such as at some arbitrary point G. When the switch 103 is closed at point G, the diode 130 is forward biased, allowing current to flow through the parallel circuit path including resistor 140 and diode 141 to charge the capacitor 136 and thereby store electrical energy for subsequent release at the beginning of the succeeding positive one-half cycle for generation of a triggering signal for SCR 101. This flow of current also provides a voltage drop across resistor 140 and diode 141 to reverse bias the gate-cathode junction of the SCR 101. Consequently, the SCR 101 cannot be triggered, notwithstanding that the anode-cathode junction thereof is forward biased by the positive terminal of the direct current potential source 149.

At the end of the negative one-half cycle B–C, the diode 130 becomes reverse biased, allowing the capacitor 136 to discharge into gate 116 to trigger SCR 101, causing the forward biased SCR to be rendered conductive. The conduction of the SCR 101 at point C, in a manner described previously in conjunction with the closing of the switch 103 at point A, is effective to trigger the SCR 100 at a point when its anode-cathode potential is zero, rendering the SCR 100 conductive and thereby energizing the load 102, as well as to start the charging of timing capacitor 179 to initiate the timing interval.

The SCR 101, once triggered and driven into conduction at point C, continues to conduct during successive positive and negative one-half cycles notwithstanding that the source 106 reverses polarity. This result obtains because the source 149 forward biases the anode-cathode junction of rectifier 101 independent of the polarity of source 106. The SCR 100, which is triggered at point D and rendered conductive, continues to be conductive throughout the positive one-half cycle C–D. With SCR 101 conducting, the capacitor 106 continues charging.

At point D, corresponding to the beginning of the negative one-half cycle D–E, the anode-cathode junction of SCR 100 is reverse biased by the source 106, rendering the SCR 100 nonconductive, and hence, de-energizing the load 102. The SCR 100 remains nonconductive during the remainder of the negative one-half cycle D–E.

At point E, corresponding to the beginning of the positive one-half cycle E–F, the anode-cathode junction of SCR 100 becomes forward biased, and is rendered conductive by the triggering signal at gate 117 which is continuously applied through both negative and positive one-half cycles so long as a voltage drop is present across divider portion 151. Thus, at point E, the SCR 100 is again rendered conductive for a positive one-half cycle, namely positive one-half cycle E–F, thereby energizing the load 102 for another positive one-half cycle.

The exact point in potential waveform W where SCR 100 latches varies with the load and characteristics of the SCR, occurring later for inductive loads and SCR's with higher latching currents.

The SCR 100 continues to be rendered conductive during positive one-half cycles and nonconductive during negative one-half cycles to alternately energize and de-energize the load 102 on a one-half wave rectifier basis so long as a voltage drop exists across divider portion 151 to provide a triggering signal for gate 117. The interval during which such a voltage drop appears across divider portion 151 is controlled by the R-C timing circuit 167. Until the SCR 101 is first rendered conductive at point C, causing current to flow through the divider 150, the line 110 which is connected to one side of the timing capacitor 179 is at the same potential as the positive terminal of source 149 which through resistors 153 and 178 is connected to the other side of the capacitor 179. Thus, until the SCR 100 conducts at point C, the timing capacitor 179 does not charge.

However, once the SCR 101 conducts at point C, allowing current to flow through the divider 150 to lower the potential of line 110 relative to tap point 155, the capacitor 179 starts charging, thereby initiating the timing interval during which a triggering signal is applied to SCR gate 117 to enable SCR 100 to periodically conduct and energize the load 102. The rate at which the capacitor 179 charges is determined by the resistance in the charging path, and is varied by changing the resistance of variable resistor 178. The capacitor 179 continues to charge irrespective of periodic reversals of polarity of the source 106 and hence irrespective of the periodic nature of the conduction of SCR 100 and energization of load 102.

When the capacitor 179 has charged to a voltage corresponding to the breakover voltage of the unijunction transistor 166, the capacitor 179 discharges into the emitter 177 of unijunction transistor 166 causing it to momentarily conduct and produce a momentary current flow through the resistors 173 and 176. Current flow through resistor 176 raises the potential of the gate 171 of SCR 165, triggering this SCR. SCR 165, in turn, is rendered conductive, allowing current to flow into the base 163 of transistor 160, switching transistor 160 from the conductive state to a conductive state. The conduction of transistor 160 produces a low impedance shunt path in parallel with the divider portion 151, effectively short-circuiting the junction formed by the gate 117 and the cathode 111 of SCR 100.

If the time constant of the R-C network 167 is such that the capacitor 179 discharges, momentarily rendering conductive the unijunction transistor 166 and in turn the SCR 165 and the transistor 160, at a point during a positive one-half cycle, such as point H, the SCR 100 continues to conduct energizing the load 102 until the source 106 reverse biases the anode-cathode junction of SCR 100, causing it to be driven into nonconduction at point K. When the SCR 100 is again forward biased at point L, the SCR 100 is not rendered conductive due to the absence of a triggering signal on its gate 117 caused by the short-circuiting of its gate-cathode junction by conducting transistor 160. Thus, the load is deenergized at a zero point in the supply potential waveform W by expiration of the R-C interval during a positive one-half cycle.

Should the timing interval established by the R-C network 167 terminate during a negative one-half cycle, such as at point N in negative one-half cycle M–P, the load 102 is also de-energized at a zero potential point. Specifically, if the timing interval ends at point N, the gate-cathode junction of the nonconducting rectifier 100 is immediately short-circuited in the manner described previously, preventing the SCR 100 from being rendered conductive during the succeeding positive one-half cycle at point P. Hence, the de-energization of the load at point M constitutes the end of the load energization interval. Thus, if the timing interval ends during a negative one-half cycle, the load 102 is de-energized at a zero point in the supply potential waveform W.

Transistor 160 is held in a conductive state by the SCR 165 which latches in a conductive state when the R-C time interval expires and the capacitor 179 discharges, triggering the unijunction transistor 166. Thus, when the time interval determined by the R-C constant of timing network 167 expires, firing unijunction transistor 166, latching SCR 165 in a conductive state, and in turn holding transistor 160 in conduction, the gate-cathode junction of SCR 100 is continuously short-circuited, preventing SCR 100 from again being driven into conduction during subsequent positive one-half cycles. Consequently, the load 102 having been de-energized is not further energized during succeeding positive one-half cycles.

The SCR 101 continues to be energized as long as the switch 103 remains closed notwithstanding that the SCR 100 no longer conducts and the load 102 is no longer energized. The short-circuiting of the divider portion 151 by the conducting transistor 160 is ineffective to remove the forward bias from the anode-cathode junction of SCR 100 supplied by the positive terminal of the source 149.

If the switch 103 is left in the closed position, in addition to the SCR 101 continuing to conduct, the unijunction transistor 166 is periodically fired by the R-C timing network 167. Specifically, as long as SCR 101 continues to conduct, the capacitor 179 periodically charges through resistor 178, and periodically discharges into the emitter 177 firing the unijunction transistor 166. However, the firing of the unijunction transistor 166 is ineffective to change the state of conduction of the latched SCR 165. Consequently, the transistor 160 remains conductive, continuing to short-circuit the gate-cathode junction of the SCR 100, preventing SCR 100 from becoming conductive and energizing the load during subsequent positive one-half cycles when the SCR 100 becomes forward biased by source 106.

When the switch 103 is opened, the circuit is readied for another load energization sequence. Specifically, opening switch 103 terminates conduction of SCR 101. In addition, the electrical path for charging the capacitor 179 is open-circuited since the connection to grounded line 115 no longer exists. Any charge on the capacitor 179 is dissipated when switch 103 opens by firing of unijunction 166. The unijunction transistor 166 fires when switch 103 is opened independent of the magnitude of the charge level on capacitor 179 due to the drop in voltage between tap point 155 and line 110 which effectively brings the unijunction transistor breakover voltage to zero.

Figure 4:
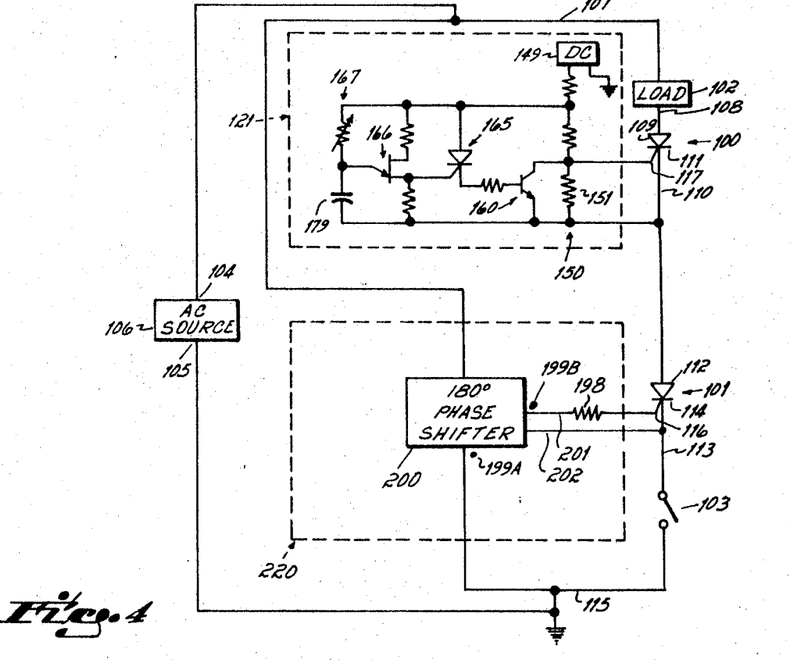
FIGURE 4 is an embodiment of a control circuit for energizing a load for a predetermined interval beginning and ending at a zero point, which in independent of the point in the supply potential waveform when the switch is actuated to initiate the energization interval.

A second embodiment of a control circuit suitable for triggering an SCR, through which the load is energized, for a predetermined interval beginning and ending at points where the SCR anode-cathode potential is zero is depicted in FIGURE 4. Identical reference numerals in FIGURES 2 and 4 identify like circuit elements. With the exception of the use of a phase shifter 200 in the triggering circuit 220 to provide a triggering signal for one SCR 101, the circuit shown in FIGURE 4 is identical to that shown in FIGURE 2.

Specifically, the control circuit of FIGURE 4 includes the SCR 100 and the SCR 101 adapted to be connected with the load 102 between the terminals 104 and 105 of the alternating current source 106. The triggering circuit 121 provides a triggering signal on gate 117 of SCR 100 for a predetermined timing interval, which interval is initiated in response to the conduction of the SCR 101. Since the structure and operation of the triggering circuit 121 of FIGURE 4 is identical to the triggering circuit 121 shown in FIGURE 2, a further description is not made herein.

The phase shifter 200 is connected across the supply terminals 104 and 105 of the source 106 via lines 107 and 115, and has a pair of output lines 201 and 202 which are connected respectively to the gate 116 via a current limiting resistor 198 and the cathode 114 of the SCR 101. The phase shifter 200 functions as a triggering signal source for forward biasing the gate-cathode junction of SCR 101 during negative one-half cycles when the source 106 reverse biases the SCR 100. For the purpose of clarity, dots 199A and 199B are shown on the input and output lines 115 and 201, respectively, of the phase shifter 200 to represent the lines of like polarity.

To energize the load 102 for a predetermined interval, the switch 103 is closed. The switch 103, since it is closed at random, may be closed during either a positive one-half cycle such as O-B, or a negative one-half cycle such as B-C of the waveform W depicted in FIGURE 7. Assume that the switch 103 is closed at some arbitrary point A during the positive one-half cycle O-B. From the discussion of the circuit of FIGURE 2, it is remembered that prior to the closure of the switch 103, the anode 112 of rectifier 101 has applied to it, due to the absence of current in divider 150, a positive potential by the positive terminal of the source 149. It is also remembered that the gate 117 and the cathode 111 of SCR 100 are at substantially the same potential due to the absence of current flow through the lower portion 151 of the divider 150.

When the switch 103 is closed at point A, the anode-cathode junction of SCR 101 is forward biased. However, the SCR 101 is not rendered conductive due to the application of a negative potential across the gate-cathode junction provided by the output lines 201 and 202 of the phase shifter 200. When the waveform reaches point B, corresponding to the beginning of the negative one-half cycle B-C, the signal applied to the gate-cathode junction of SCR 101 by the phase shifter output lines 201 and 202 changes from negative to positive, producing a triggering signal. Since the anode-cathode junction of SCR 101 is forward biased both during positive and negative one-half cycles by the positive terminal of the source 149, the application by the phase shifter 200 to the gate 116 of the SCR 101 of a triggering signal at point B causes this SCR to conduct. Once the SCR 101 is rendered conductive, it remains conductive during the remainder of the negative one-half cycle B-C, as well as during subsequent positive and negative one-half cycles, due to the continuous forward biasing of the anode-cathode junction by the source 149.

The conduction of SCR 101 at point B causes current to flow through the voltage divider 150. This current flow produces a voltage drop across the lower divider portion 151 which functions to apply a triggering signal to gate 117 and thereby forward bias the gate-cathode junction of SCR 100. Since the SCR 100 conducts during both positive and negative one-half cycles, the triggering signal to gate 117 produced by the voltage drop across the divider portion 151 is applied to forward bias the gate-cathode junction of SCR 100 during both positive and negative one-half cycles.

The application of a triggering signal to gate 117 of SCR 100 beginning at point B when the SCR 101 begins conducting is not sufficient to render conductive the SCR 100 due to the fact that SCR 100 is reverse biased by the source 106 during the negative one-half cycle B-C. However, at point C corresponding to the beginning of the succeeding positive one-half cycle C-D, the SCR 100 is in a condition to be rendered conductive for energizing the load 102 because of the coincidence of both a forward bias or triggering signal on its gate-cathode junction produced by a voltage drop across voltage divider portion 151 and a forward bias on its anode-cathode junction produced by the source 106. The SCR 100, once rendered conductive, continues conducting during the entire positive one-half cycle C-D thereby energizing the load 102 for one-half cycle.

However, at point D corresponding to the beginning of the negative one-half cycle D–E, the SCR 100 becomes reverse biased by the source 106, terminating conduction of SCR 100 which in turn de-energized the load 102 at a zero point in the supply potential waveform. The SCR 100 is again in a condition to be rendered conductive at point E, corresponding to the beginning of the successive positive one-half cycle E–F, by the triggering signal continuously produced by the voltage drop across the voltage divider portion 151. Thus, the load 102 is energized for another one-half cycle.

The SCR 100 can be triggered at point C and rendered conductive, and the load 102 energized, by closing the switch 103 during some arbitrary point of a negative one-half cycle, such as point G in negative one-half cycle B–C. Closure of the switch at point G applies, at the instant of closure, a positive triggering signal to the gate 116 of the SCR 101, rendering SCR 101 immediately conductive due to its being forward biased by the positive terminal of source 149. The conduction of SCR 101 produces a current flow through the divider 150, which in turn produces a voltage drop across divider portion 151, applying a triggering signal to the gate 117 of the rectifier 101. The mere presence of a triggering signal on gate 117 of SCR 100 during the negative one-half cycle portion G–C following conduction of SCR 101 is ineffective to render conductive SCR 100 since the anode-cathode junction of SCR 100 is reverse biased by the source 106.

However, at point C, corresponding to the beginning of the succeeding positive one-half cycle C–D, the SCR 100 is forward biased by the source 106. The application at point C of a forward bias to the anode-cathode junction of SCR 100, in conjunction with the application to the gate 117 of a triggering signal by the voltage divider portion 151, causes SCR 100 to be rendered conductive and thereby energize the load 102. The SCR 100 continues to be conductive during positive one-half cycles and non-conducting during negative one-half cycles in the manner described previously in conjunction with closing the switch 103 at point A.

The exact point in potential waveform W of latching of SCR 100 depends, as described previously, on the load impedance and SCR characteristics, occurring later for inductive loads and high SCR latching currents.

Regardless of whether the switch 103 is closed during a positive one-half cycle such as at point A or a negative one-half cycle such as at point G, once the SCR 101 is rendered conductive, the SCR 100 continues to be rendered conductive during successive positive one-half cycles, thereby energizing the load on a one-half wave rectified basis, until the timing interval established by the R–C timing circuit 167 expires. When this occurs, capacitor 179 discharges, causing the unijunction transistor 166 to fire, which in turn latches in a conductive state the SCR 165, which in turn renders continuously conductive the transistor switch 160, which in turn short-circuits the gate 117 and the cathode 111 of SCR 100, terminating the triggering signal to gate 117.

If the timing interval established by the R–C timing network 167, which timing interval begins when the SCR 101 conducts, terminates during a positive one-half cycle such as at point H the SCR 100 continues to conduct, energizing the load, during the remainder of that positive one-half cycle, that is, continues to conduct until point K is reached. However, once point K is reached, the forward biasing of the anode-cathode junction of the SCR 100 during successive positive one-half cycle, such as at point L, is ineffective to render the SCR 100 conductive due to the absence of a triggering signal on its gate 117 caused by the short-circuiting action of conducting transistor 160. Thus, the load 102, which was de-energized at point K, remains de-energized.

Should the timing interval established by the R–C timing network 167 expire during a negative one-half cycle, such as at point N, the SCR 100 which is now non-conductive due to the reverse bias of its anode-cathode junction applied by the source 106, does not again conduct when its anode-cathode junction is forward biased by the source 106 due to the short-circuiting of its gate-cathode junction by the conducting transistor switch 160. Thus, regardless of whether the timing interval established by the R–C timing network 167 expires during a negative or positive one-half cycle, the load is de-energized at a zero point in the supply potential waveform.

Figure 6:
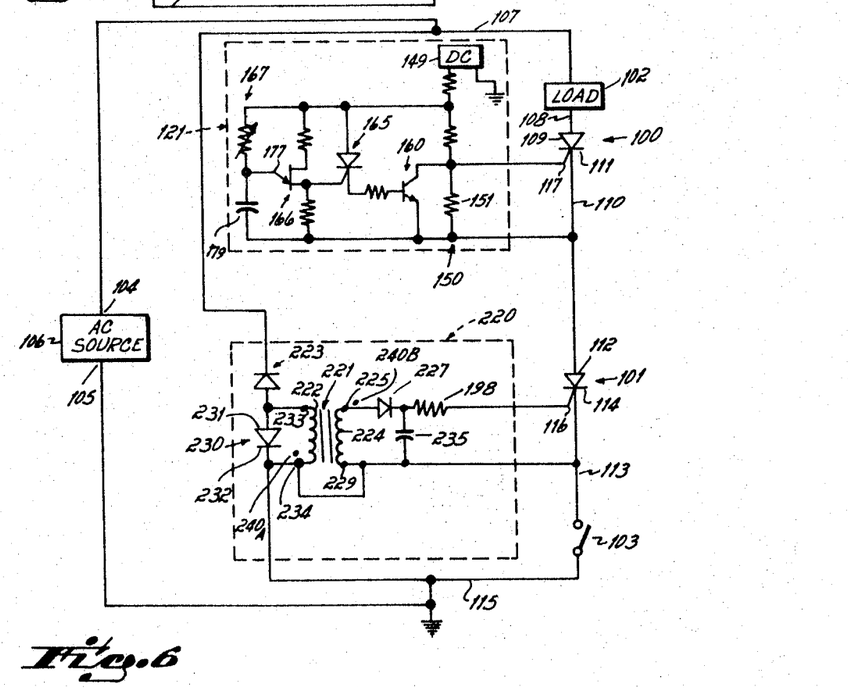
FIGURE 6 is a further embodiment of a switch responsive control circuit for energizing a load for a predetermined interval beginning and ending at a zero point, which is independent of the point in the supply potential waveform when the switch is actuated to initiate the energization interval.

A third embodiment of a control circuit for triggering an SCR through which the load is energized for a predetermined interval beginning and ending at points where the SCR anode-cathode potential is zero is shown in FIGURE 6. The control circuit of FIGURE 6, like the control circuit of FIGURES 2 and 4, employs the SCR 100 and the SCR 101 which are connected with the load 102 between the supply terminals 104 and 105 of the source 106. In addition, the circuit of FIGURE 6, like the circuits of FIGURES 2 and 4, utilizes a triggering circuit 121 for providing a triggering signal to the SCR 100 of a predetermined duration initiated in response to the conduction of the SCR 101. Further, the control circuit of FIGURE 6, like the control circuit of FIGURE 4, utilizes a triggering circuit 220 having phase shifting circuit 200 for triggering SCR 101 during negative one-half cycles when the anode-cathode junction of SCR 100 is reverse biased.

In the circuit of FIGURE 6, the phase shifter 220 includes a transformer 221 having a primary winding 222 which is connected in series with a diode 223 between the supply terminals 104 and 105 of the source 106. The diode 223 is oppositely poled with respect to the SCR 100 to prevent an input to the transformer primary winding 222 during positive one-half cycles when the anode-cathode junction of SCR 100 is forward biased by the source 106. The transformer 221 further includes a secondary winding 224 having one terminal 225 connected to the gate 116 of SCR 101 via a diode 227 and a current limiting resistor 198, the diode 227 being poled to be forward biased when the source 106 provides a reverse bias across the anode-cathode junction of SCR 100. The transformer secondary winding 224 has a second terminal 229 connected to the cathode 114 of SCR 101 via the line 113. The transformer 221 is wound such that the potential across output terminals 225 and 229 is phase shifted approximately 180 electrical degrees relative to the potential of input terminals 233 and 234. For clarity, like polarity terminals are provided with dots 240A and 240B.

A diode 230 is connected to the primary winding 222. The diode has an anode 231 and a cathode 232 connected to terminals 233 and 234, respectively, of the primary winding 222. The diode 230 functions to retard the collapse of the field in the primary winding 222 during negative one-half cycles, reducing the peaks of the induced voltage output from the transformer secondary winding 224, and thereby reducing transients in the phase shifter or triggering circuit 220. A capacitor 235 is connected between the line 113 and the junction formed by the diode 227 and the current limiting resistor 198. The capacitor 235 functions to lengthen the width of the output signal provided by the secondary winding 224 and thereby insure that the triggering signal applied to the gate 116 of the SCR 101 is of sufficient duration to enable the SCR 101 to be reliably rendered conductive during a negative one-half cycle. The diode 227 prevents the capacitor 235 from discharging into the secondary winding 224.

With the switch 103 open, a positive potential is applied to the anode 112 of SCR 101 via the divider 150 by the positive terminal of the source 149. The SCR 101 does not conduct, however, due to the open condition of switch 103. In addition, with switch 103 open, the gate 117 and the cathode 111 of SCR 100 are at substantially the same patential.

When the switch 103 is closed at some arbitrary point in a positive one-half cycle, such as at point A in positive one-half cycle O–B of FIGURE 7, the phase shifting transformer 221 has no input to its primary winding 222 because of the reverse bias on the diode 223 in the primary winding circuit. Consequently, a triggering signal is not developed to trigger the gate 116 of the SCR 100 during the positive one-half cycle O–B, and the SCR 100, although its anode-cathode junction is forward biased by the source 149, is not rendered conductive during positive one-half cycle O–B.

When the waveform reaches point B, the diode 223 is forward biased by source 106 and a triggering output is provided by the secondary winding 224 which is applied to the gate 116 of SCR 101 via the diode 227, capacitor 235, and current limiting resistor 198. Since the anode-cathode junction of SCR 101 is forward biased during both positive and negative one-half cycles by the source 149, the application during the negative one-half cycle B–C of a triggering signal to the SCR gate 116 renders the SCR 101 conductive. Conduction of the SCR 101 allows current to flow through the divider 150 producing a voltage drop across divider portion 151 which forward biases the gate-cathode junction of SCR 100. SCR 100 cannot conduct during the negative one-half cycle B–C notwithstanding the application of the triggering signal to its gate 117 since the SCR anode-cathode junction is reverse biased by the source 106.

At point C, corresponding to the beginning of the succeeding positive one-half cycle C–D, the anode-cathode junction of SCR 100 is forward biased by the source 106. The simultaneous forward biasing of the anode-cathode junction of SCR 100 and the application of a triggering signal by the voltage divider portion 151 to gate 117 of SCR 100 renders the SCR 100 conductive, energizing the load 102. The SCR continues to be energized during the remainder of the positive one-half cycle C–D. At point D, corresponding to the beginning of the negative one-half cycle D–E, the anode-cathode junction of SCR 100 is reverse biased by the source 106, terminating conduction of the SCR 100 and thereby deenergizing the load 102. At point E, corresponding to the beginning of the succeeding positive one-half cycle E–F when the anode-cathode junction of SCR 100 is again forward biased by the source 106, the SCR 100 rendered conductive due to the continuous presence of a triggering signal at its gate 117 provided by the lower portion 151 of the divider 150. Thus, the load 102 is again energized for one-half cycle.

The SCR 100 can be triggered at point C and rendered conductive, and the load 102 energized, by closing the switch 103 at some point in a negative one-half cycle, such as point G in the negative one-half cycle B–C. Closure of the switch 103 during a negative one-half cycle B–C at point G results in the immediate application of a triggering signal through the diode 227 and the resistor 198 to the gate 116 of SCR 101 rendering this SCR conductive. The conduction of SCR 101 is effective to allow current to flow through the divider 150, applying a triggering signal to the gate 117 of SCR 100. Since SCR 100 is reverse biased by the source 106 at point G, the mere presence of a triggering signal on the gate 117 is ineffective to render it conductive until the beginning of the succeeding positive one-half cycle, that is, until point C is reached. At point C, the SCR anode-cathode junction is forward biased by the source 106, causing the triggered SCR 100 to be rendered conductive and the load 102 energized.

The point in waveform W where SCR 100 latches depends on the impedance of the load and the latching characteristics of the SCR in the manner described previously in connection with FIGURES 2 and 4.

The load 102 continues to be energized during positive one-half cycles until the triggering signal provided by the divider portion 151 is terminated by the conductive condition of the transistor switch 160 which short-circuits the gate-cathode junction of SCR 100. The transistor switch 160 is rendered conductive when the timing interval, which is initiated by the conduction of SCR 100, terminates. Termination of the timing interval causes the capacitor 179 to discharge into the emitter 177 of the unijunction transistor 166, firing the unijunction transistor, which in turn triggers the SCR 165 causing this SCR to latch in the conductive condition, which in turn renders transistor 160 continuously conductive to short-circuit the gate-cathode junction of SCR 100 and thereby prevent SCR 100 from being rendered conductive during succeeding positive one-half cycles when its anode-cathode junction is forward biased by the source 106.

As described previously in conjunction with the circuits of FIGURES 2 and 4, the timing interval established by the R–C timing network 167 of FIGURE 6 may terminate during either a positive one-half cycle such as at point H or during a negative one-half cycle such as at point N. In either case, the SCR 100 is rendered nonconductive and the load de-energized at a zero point in the supply potential waveform. Specifically, if the timing interval established by the R–C network 167 terminates during a positive one-half cycle, such as at point H, the SCR 100 is rendered nonconductive at point K, de-energizing the load, and remains in this condition until the switch 103 is opened and thereafter closed to initiate a second timing cycle. If the timing interval terminates during a negative one-half cycle, such as at point N, the SCR 100, which is already in the nonconducting condition as of point M, remains nonconductive during subsequent positive one-half cycles due to the absence of a triggering signal on its gate 117. Thus, a circuit is described which energized the load for a predetermined interval beginning and ending at zero current points regardless of when the switch 103 is closed.

While the control circuit of this invention has been described with respect to certain specific embodiments thereof, those skilled in the art will appreciate that a number of modifications may be made in the respective circuits without departing from the spirit and scope of this invention. For example, the control circuits of FIGURES 1–6 have been described with respect to energizing a load on a one-half wave rectified basis, that is, during positive one-half cycles only. It will be obvious to those skilled in the art that energization of a load on a full wave rectified basis, that is, during both positive and negative one-half cycles, may be accomplished by a duplication of the respective control circuits. For example, energization of the load 15 of FIGURE 1 on a full wave rectified basis can be accomplished by providing a second triggering circuit and a second SCR which are connected in parallel with the triggering circuit 28 and the rectifier 10, but reversed in polarity. Specifically, the anode of the second rectifier is connected to the load terminal 16. In like manner, the cathode of the diode of the second triggering circuit, corresponding to the diode 30, is connected to the supply terminal 17 while the junction corresponding to the junction of resistor 40, diode anode 43, and resistor 45 is connected to the supply terminal 18. With the second SCR and second triggering circuit so connected, SCR 10 conducts during positive one-half cycles while the second SCR conducts during negative one-half cycles, energizing the load on a full-wave rectified basis.

Alternatively, full wave rectification may be provided with oppositely poled SCR's without duplicating the triggering circuit. Such may be accomplished by utilizing negative one-half cycle SCR slaving techniques. Specifically, the second SCR may be provided with means for making its conduction dependent on conduction of SCR 10. For example, a capacitor, a first resistor and a diode may be connected in series between the cathode of the second SCR and the supply terminal 17, with the diode poled oppositely to the second SCR and a second resistor placed in parallel with the capacitor between the gate of the second SCR and the junction of the first resistor and capacitor. With such an arrangement, when SCR 10 conducts during positive one-half cycles the capacitor of the slave circuit charges through the diode and first resistor, and discharges through the second resistor at the beginning of the negative one-half cycle, supplying the trigging signal for the second SCR.

In FIGURES 2, 4 and 6 the direct current potential source 149 is shown as being independent of the alternating current source 106. In practice, the direct current source 149 may be in the form of a capacitor and diode connected in series between the alternating current supply terminals 104 and 105 with the diode poled in the same direction as the SCR 101 and the positive side of the capacitor connected to the anode of SCR 101. With such an arrangement, the capacitor charges through the diode during positive one-half cycles to the maximum voltage of the alternating current source whereupon the voltage across the capacitor remains substantially constant and can be used to positively bias the anode-cathode junction of SCR 101 when the switch 103 is closed.

If desired, high frequency bypass filters may be connected in the gate circuits of the SCR's of FIGURES 1–6 to avoid false triggering by high frequency transient signals produced as a consequence of using circuiting elements which exhibit non-ideal operational characteristics.

In the discussion of the operation of the circuits of FIGURES 1–6, it has been indicated that when the switch is closed during a negative one-half cycle the SCR's latch during the positive one-half cycle following the negative one-half cycle of switch closure. Those skilled in the art will appreciate that if switch closure occurs very late in a negative one-half cycle, sufficient energy may not be developed during the remainder of the negative one-half cycle to provide triggering at the beginning of the succeeding positive one-half cycle. Consequently, the SCR does not latch during the positive one-half cycle immediately following the negative one-half cycle of switch closure. Instead, latching occurs at the beginning of the next positive one-half cycle when the switch has been closed for at least one full negative one-half cycle. Thus, even when switch closure occurs very late in a negative one-half cycle, triggering occurs at a zero potential point, although after a delay of one full cycle.

In determining the time period during which the circuits of FIGURES 2, 4 and 6 energize one load, the actual timing interval established by the R–C timing network 167 must be selected to be twice as long as the interval during which it is desired to energize the load. This is necessitated by the fact that the capacitor 179 of the R–C timing network charges during both positive and negative one-half cycles, while the load is energized during positive one-half cycles only. Consequently, the load is actually energized one-half of the interval established by the R–C timing network 167. Of course, should the load be energized on a full wave rectified basis in the manner indicated previously, the timing interval established by the R–C timing network 167 will correspond substantially to the period of load energization, and the interval need not be twice as long as in the case of load energization on a one-half wave rectification basis.

It will also be apparent from an examination of the circuits of FIGURES 4 and 6 that the period of load energization does not exactly correspond to one-half the interval established by the R–C timing network 167. In the circuits of FIGURES 4 and 6, the SCR 100 can, under certain circumstances, initiate conduction up to one-half cycle prior to the time SCR 100, through which the load is energized, is rendered conductive. Since the capacitor 179 of the R–C timing network 167 initiates charging at the instant of energization of SCR 101, and not when SCR 100 through which the load is energized is rendered conductive, it is possible for the timing interval established by the R–C network 167 to exceed twice the actual period of conduction of SCR 100 by an amount by which the conduction of SCR 101 preceded that of SCR 100. As indicated, this error at most amounts to an error of one-half cycle in the total R–C timing interval. Since the total R–C timing interval is really twice the actual interval of conduction of SCR 100, the error in energization of the load is reduced by one-half. Consequently, the maximum error in energizing the load is one-fourth of a cycle for any given R–C timing interval.

In the circuit of FIGURE 2, the error described above is not present inasmuch as SCR 101 is not rendered conductive until the bias on SCR 100 provided by the supply changes from negative to positive due to the reverse biasing of the gate-cathode junction of SCR 101 by the voltage drop across resistor 140. Hence, SCR 101 is rendered conductive to initiate charging of the timing capacitor 179 immediately preceding the point at which SCR 100 is rendered conductive to energize the load.

I claim:

1. A control circuit adapted to enable a load, which is supplied by a source of alternating current, to be selectively energized and de-energized when the instantaneous load current is substantially zero, said control circuit comprising:
   a silicon controlled rectifier having an anode, a cathode, and a gate, said rectifier and said load being connectable in series circuit arrangement between first and second supply terminals of an alternating current source for alternately forward and reverse biasing the anode-cathode junction of said rectifier;
   a rectifier triggering circuit including:
      (a) a capacitor connected to said gate,
      (b) a capacitor charging circuit including a first resistance means connected to said gate and a diode, said capacitor charging circuit and said capacitor being series connected between said supply terminals for electrically charging said capacitor and reverse biasing the gate-cathode junction of said rectifier when said rectifier is reverse biased, and
      (c) a capacitor discharging circuit including second resistance means connected between said capacitor terminals for enabling said capacitor to discharge when the rectifier bias changes from reverse to forward and enable said rectifier to latch in a conductive state and energize said load;
   switch means electrically connected in said triggering circuit, said switch means being operable in a first state for enabling said triggering circuit to trigger said rectifier approximately when said rectifier bias changes from reverse to forward for latching said rectifier in a conductive state and energizing said load, and being operative in a second state for disabling said trigger circuit thereby enabling said rectifier to terminate conduction approximately when said rectifier bias changes from forward to reverse and to remain nonconductive when subsequently forwardly biased.

2. A control circuit for energizing a load which is supplied by an alternating current source for a predetermined interval beginning and ending when the load current and source potential, respectively, are approximately zero, said circuit comprising:
   first and second silicon controlled rectifiers having first and second gates, respectively, and first and second anodes and cathodes, respectively, said rectifiers being connectable with said load in a series circuit between first and second terminals of an alternating current source for alternately forward and reverse biasing said second rectifier;
   a first triggering circuit including:
      (a) means for forward biasing the anode-cathode junction of said first rectifier,
      (b) means interconnecting said first gate and said supply terminals for triggering said first rectifier when said second rectifier is reverse biased to enable said first rectifier to conduct when the bias on said second rectifier changes from reverse to forward;

a second trigger circuit including means responsive to the conduction of said first rectifier for triggering said second rectifier for a predetermined interval for enabling, during said predetermined interval, said second rectifier to periodically become conductive and thereby periodically energize said load when the bias on said second rectifier periodically changes from reverse to forward.

3. The control circuit of claim 2 wherein said second triggering circuit includes:

a voltage divider connected between a source of potential and said anode of said first rectifier and having a tap point connected to said gate for forward biasing the gate-cathode junction of said second rectifier when said first rectifier conducts thereby conditioning said second rectifier for conduction approximately when the bias on said second rectifier changes from reverse to forward bias, and timing means connected in circuit with said first rectifier, said timing means being responsive to the conduction of said first rectifier for a predetermined interval for substantially short-circuiting said gate-cathode junction of said second rectifier following the expiration of said interval and thereby causing said second rectifier to remain nonconductive and the load de-energized subsequent to the reverse biasing of said second rectifier by said alternating current source following said expiration.

4. The control circuit of claim 3 wherein said timing means includes:

a solid state electronic switch having first and second terminals connected between said gate and cathode of said second rectifier, and a third terminal, said switch being operative in response to inputs to said third switch terminal to exhibit low and high impedance between said first and second switch terminals for short-circuiting and not short-circuiting, respectively, said gate and cathode junction of said second rectifier; and an R-C timing network connected between a source of direct current potential and said first rectifier and having an output connected to said third switch terminal, said R-C timing network being responsive to conduction of said first rectifier for initiating a timing interval during which interval said switch is in said high impedance state and said second rectifier triggered and following which interval said switch is in said low impedance state and said second rectifier not triggered.

5. The control circuit of claim 2 wherein said interconnecting means includes a phase shifter connected between said supply terminals and having an output connected to said first gate for providing an electrical triggering signal thereto which is phase shifted approximately 180 electrical degrees with respect to the bias of said anode-cathode junction of said second rectifier.

6. The control circuit of claim 5 wherein said phase shifter includes:

transformer means having a primary winding connected between said supply terminals and a secondary winding connected between said gate and one of said supply terminal for providing at said first gate an electrical triggering signal which is phase shifted approximately 180 electrical degrees with respect to the bias of said anode-cathode junction of said second rectifier, and a diode connected between said primary winding and one of said supply terminals and poled to be reverse biased when said second rectifier is forward biased for preventing said phase shifter from applying a triggering signal to said first gate.

7. The control circuit of claim 6 wherein said phase shifter further includes:

a capacitor connected to said secondary winding and said first gate for lengthening the width of said phase shifted triggering signal, thereby enhancing triggering reliability, and a diode connected between said secondary winding and said capacitor and poled to be reverse biased when said second rectifier is forward biased for preventing said capacitor from discharging into said secondary winding.

8. The control circuit of claim 3 wherein said interconnecting means includes a phase shifter connected between said supply terminals and having an output connected to said first gate for providing a triggering signal thereto which is phase shifted approximately 180 electrical degrees with respect to the bias of said anode-cathode junction of said second rectifier.

9. The control circuit of claim 8 wherein said phase shifter includes:

transformer means having a primary winding connected between said supply terminals and a secondary winding connected between said gate and one of said supply terminals for providing at said first gate a triggering signal which is phase shifted approximately 180 electrical degrees with respect to the bias of said anode-cathode junction of said second rectifier, and a diode connected between said primary winding and one of said supply terminals and poled to be reverse biased when said second rectifier is forward biased for preventing said phase shifter from applying a triggering signal to said first gate.

10. The control circuit of claim 9 wherein said phase shifter further includes:

a capacitor connected to said secondary winding and said first gate for lengthening the width of said phase shifted triggering signal, thereby enhancing triggering reliability, and a diode connected between said secondary winding and said capacitor and poled to be reverse biased when said second rectifier is forward biased for preventing said capacitor from discharging into said secondary winding.

11. The control circuit of claim 2 wherein said interconnecting means includes:

a diode;

a capacitor connected to said first gate;

a capacitor charging circuit, said capacitor charging circuit and said capacitor being series connected between said supply terminals for electrically charging said capacitor when said second rectifier is reverse biased; and a capacitor discharging circuit including resistance means connected between said capacitor terminals for enabling said capacitor to discharge and trigger said first rectifier for rendering said first rectifier conductive when the bias on said second rectifier changes from reverse to forward.

12. The control circuit of claim 11 wherein said capacitor charging circuit includes second resistance means connected between said gate and cathode of said first rectifier for reverse biasing said gate-cathode junction of said first rectifier for preventing said first rectifier from conducting before the bias on said second rectifier changes from reverse to forward.

13. A control circuit for energizing a load supplied by an alternating current source when the instantaneous load current is substantially zero, said control circuit comprising:

a silicon control rectifier having an anode, a cathode, and a gate, said rectifier and said load being connectable in series circuit arrangement between first and second supply terminals of an alternating current source for alternately forward and reverse biasing the anode-cathode junction of said rectifier; and a triggering circuit including resistance means connected between said gate and cathode, a capacitor connected to said gate, and a diode, said diode and capacitor and resistance means being connected in series between said supply terminals with said diode poled oppositely relative to said rectifier to enable said capacitor to charge and discharge to produce triggering signals when said rectifier is reverse and forward biased, respectively.

14. A control circuit for energizing a load supplied by an alternating current source when the instantaneous load current is substantially zero, said control circuit comprising:
a silicon controlled rectifier having an anode, a cathode, and a gate, said rectifier and said load being connectable in series circuit arrangement between first and second supply terminals of an alternating current source for alternately forward and reverse biasing the anode-cathode junction of said rectifier, and
a triggering circuit including:
(a) a capacitor circuit having an output connected to said gate,
(b) a phase shifter connected to said supply terminals and to said capacitor circuit for providing an electrical input to said capacitor circuit which is phase shifted approximately 180 electrical degrees with respect to the bias of said anode-cathode junction of said rectifier for enabling energy storage in said capacitor when said rectifier is reverse biased and for releasing said stored energy for providing a triggering signal at said output when said rectifier bias changes from reverse to forward to enable said rectifier to latch in a conductive state and energize said load; and
(c) a first diode connected between said phase shifter and said capacitor circuit and poled to be ofrward biased when said rectifier is reverse biased; and
switch means electrically connected in said triggering circuit, said switch means being operable in a first state for enabling said triggering circuit to trigger said rectifier approximately when said rectifier bias changes from reverse to forward to latch said rectifier in a conductive state and energize said load, and being operative in a second state for disabling said trigger circuit thereby enabling said rectifier to terminate conduction approximately when said rectifier bias changes from forward to reverse and to remain nonconductive when subsequently forward biased.

15. A control circuit for energizing a load supplied by an alternating current source when the instantaneous load current is substantially zero, said control circuit comprising:
a silicon controlled rectifier having an anode, a cathode, and a gate, said rectifier and said load being connectable in series circuit arrangement between first and second supply terminals of an alternating current source for alternately forward and reverse biasing the anode-cathode junction of said rectifier; and
a triggering circuit including:
(a) a phase shifting transformer having a primary winding connected between said supply terminals and a secondary winding,
(b) an energy storage circuit connected to said secondary winding and said gate for storing energy output from said transformer when said rectifier is reverse biased and releasing said stored energy when said rectifier is forward biased for providing a triggering signal at said gate when the rectifier bias changes from reverse to forward to enable said rectifier to latch in a conductive state and energize said load, said energy storage circuit including a diode connected to said secondary winding and poled to be forward biased when said rectifier is reverse biased, and a capacitor having a terminal connected in common to said diode and said gate for charging through said diode when said rectifier is reverse biased and discharging when said rectifier is forward biased to provide said triggering signal on said gate when said rectifier bias changes from reverse to forward to enable said rectifier to latch in a conductive state and energize said load, and
(c) a second diode connected between said primary winding and one of said supply terminals and poled to be reverse biased when said rectifier is forward biased for preventing said capacitor from charging when said rectifier is forward biased.

16. A control circuit for energizing a load supplied by an alternating current source when the instantaneous load current is substantially zero, said control circuit comprising:
a silicon controlled rectifier having an anode, a cathode, and a gate, said rectifier and said load being connectable in series circuit arrangement between first and second supply terminals of an alternating current source for alternately forward and reverse biasing the anode-cathode junction of said rectifier; and
a triggering circuit including:
(a) a phase shifting transformer having a primary winding connected between said supply terminals and a secondary winding,
(b) an energy storage circuit connected to said secondary winding and said gate for storing energy output from said transformer when said rectifier is reverse biased and releasing said stored energy when said rectifier is forward biased for providing a triggering signal at said gate when the rectifier bias changes from reverse to forward to enable said rectifier to latch in a conductive state and energize said load, and
(c) switch means electrically connected in said triggering circuit, said switch means being operable in a first state for enabling said triggering circuit to trigger said rectifier approximately when said rectifier bias changes from reverse to forward to enable said rectifier to latch in a conductive state and energize said load, and being operative in a second state for disabling said trigger circuit thereby enabling said rectifier to terminate conduction approximately when said rectifier bias changes from forward to reverse and to remain nonconductive when subsequently forward biased.

17. The control circuit of claim 16 wherein said switch means is connected in circuit arrangement with said secondary winding.

18. A circuit for triggering the gate of a silicon controlled rectifier series connected with a load between supply terminals of an alternating current source which alternately forward and reverse biases the anode-cathode junction of said rectifier, said triggering circuit comprising:
a capacitor circuit connected between said supply terminals and having an output connected to said gate, a diode, and resistance means connected between said gate and said cathode for reverse biasing the gate-cathode junction when said rectifier is reverse biased, said diode and capacitor and resistance means being connected in series between said supply terminals with said diode poled oppositely relative to said rectifier to enable said capacitor circuit to store energy and release energy to produce said triggering signal when said rectifier is reverse and forward biased, respectively.

19. A control circuit adapted to enable a load, which is supplied by a source of alternating current, to be selectively energized and deenergized when the instantaneous load current is substantially zero, said control circuit comprising:
a silicon control rectifier having an anode, a cathode, and a gate, said rectifier and said load being connectable in series circuit arrangement between first and second supply terminals of an alternating current source for alternately forward and reverse biasing the anode-cathode of said rectifier;
a rectifier trigger circuit including:
  (a) a capacitor,
  (b) a diode poled oppositely relative to said rectifier and having an anode and a cathode, said capacitor being connected between said gate and said anode of said diode;
  (c) a capacitor charging circuit connected between said supply and said capacitor for charging said capacitor when said rectifier is reverse biased, and
  (d) a capacitor discharging circuit connected between said capacitor terminals for enabling said capacitor to discharge when the rectifier bias changes from reverse to forward and enable said rectifier to latch in a conductive state and energize said load.

References Cited

UNITED STATES PATENTS

| | | |
|---|---|---|
| 3,283,177 | 11/1966 | Cooper. |
| 3,335,291 | 8/1967 | Gutzwiller. |
| 3,391,332 | 7/1968 | Funfstuck _______ 321—47 XR |

JOHN F. COUCH, Primary Examiner

W. M. SHOOP, JR., Assistant Examiner

U.S. Cl. X.R.

307—133; 323—39